(12) United States Patent
Nakamura et al.

(10) Patent No.: US 7,347,947 B2
(45) Date of Patent: Mar. 25, 2008

(54) METHODS FOR FILTRATING AND PRODUCING POLYMER SOLUTION, AND FOR PREPARING SOLVENT

(75) Inventors: Toshikazu Nakamura, Kanagawa (JP); Yuji Suzuki, Kanagawa (JP); Masaru Sugiura, Kanagawa (JP)

(73) Assignee: FUJIFILM Corporation, Kanagawa (JP)

( * ) Notice: Subject to any disclaimer, the term of this patent is extended or adjusted under 35 U.S.C. 154(b) by 496 days.

(21) Appl. No.: 10/686,621

(22) Filed: Oct. 17, 2003

(65) Prior Publication Data

US 2006/0175257 A1 Aug. 10, 2006

(30) Foreign Application Priority Data

Oct. 18, 2002 (JP) ............... 2002-304754

(51) Int. Cl.
*B01D 37/00* (2006.01)
(52) U.S. Cl. .............. 210/767; 210/778; 536/58; 536/127
(58) Field of Classification Search ........ 210/503–509, 210/639, 743, 767, 777, 778; 425/197–199; 430/281.1, 531, 538; 536/58, 69, 70, 71, 536/76, 124, 127; 525/268; 526/169.2
See application file for complete search history.

(56) References Cited

U.S. PATENT DOCUMENTS

| | | | |
|---|---|---|---|
| 3,600,463 A * | 8/1971 | Plonsker .............. 525/268 |
| 3,804,815 A * | 4/1974 | Hagemeyer et al. ..... 526/169.2 |
| 4,077,880 A * | 3/1978 | Lorenz et al. .............. 210/806 |
| 5,462,653 A * | 10/1995 | Hills .......................... 210/85 |
| 5,618,622 A * | 4/1997 | Gillberg-Laforce et al. .......................... 428/357 |
| 5,800,718 A * | 9/1998 | Gaudette ..................... 210/714 |
| 6,830,715 B1 * | 12/2004 | Reinehr et al. ........... 264/37.28 |
| 6,945,411 B1 * | 9/2005 | Bormann et al. ............ 210/491 |

FOREIGN PATENT DOCUMENTS

| JP | 2000-256477 A | 9/2000 |
|---|---|---|
| JP | 2001-1745 | 3/2001 |

\* cited by examiner

*Primary Examiner*—Joseph Drodge
(74) *Attorney, Agent, or Firm*—Birch, Stewart, Kolasch & Birch, LLP

(57) ABSTRACT

A cellulose acetate solution is filtrated with a filter medium formed of cellulose fiber. Hydroxyl groups on the filter medium are substituted to other functional groups. An acidic material is added to the cellulose acetate solution, and the filtration is preformed. In order to estimate the hydrogen ion concentration of the organic solvent, a sample solvent of thereof is mixed with water so as to transport hydrogen ions from the sample solvent to the water of a predetermined volume. Then the water is separated from the sample solvent, and the pH value of the water is measured with a pH meter. The result of the measurement is regarded as the pH value of the organic solvent.

30 Claims, 13 Drawing Sheets

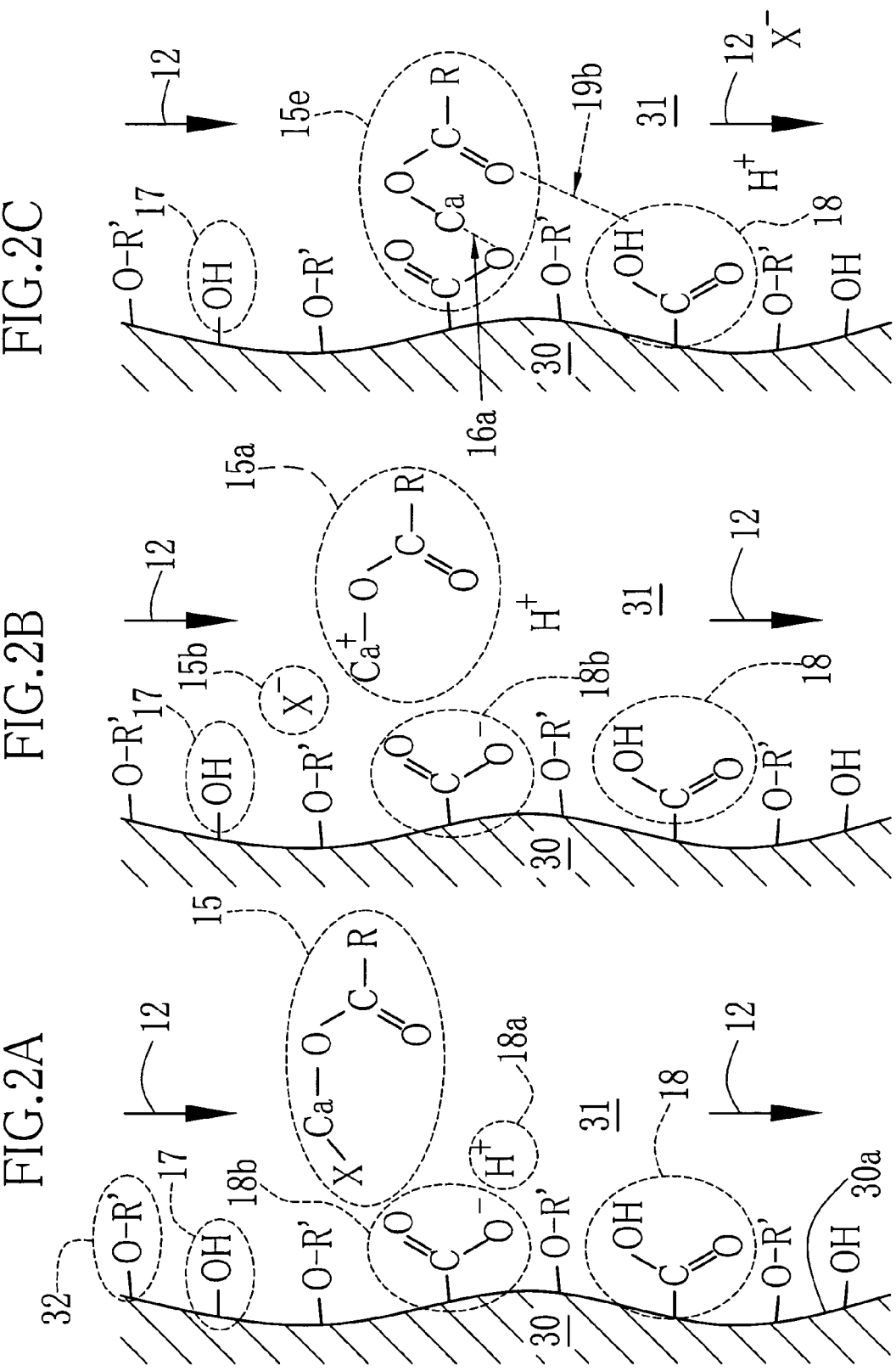

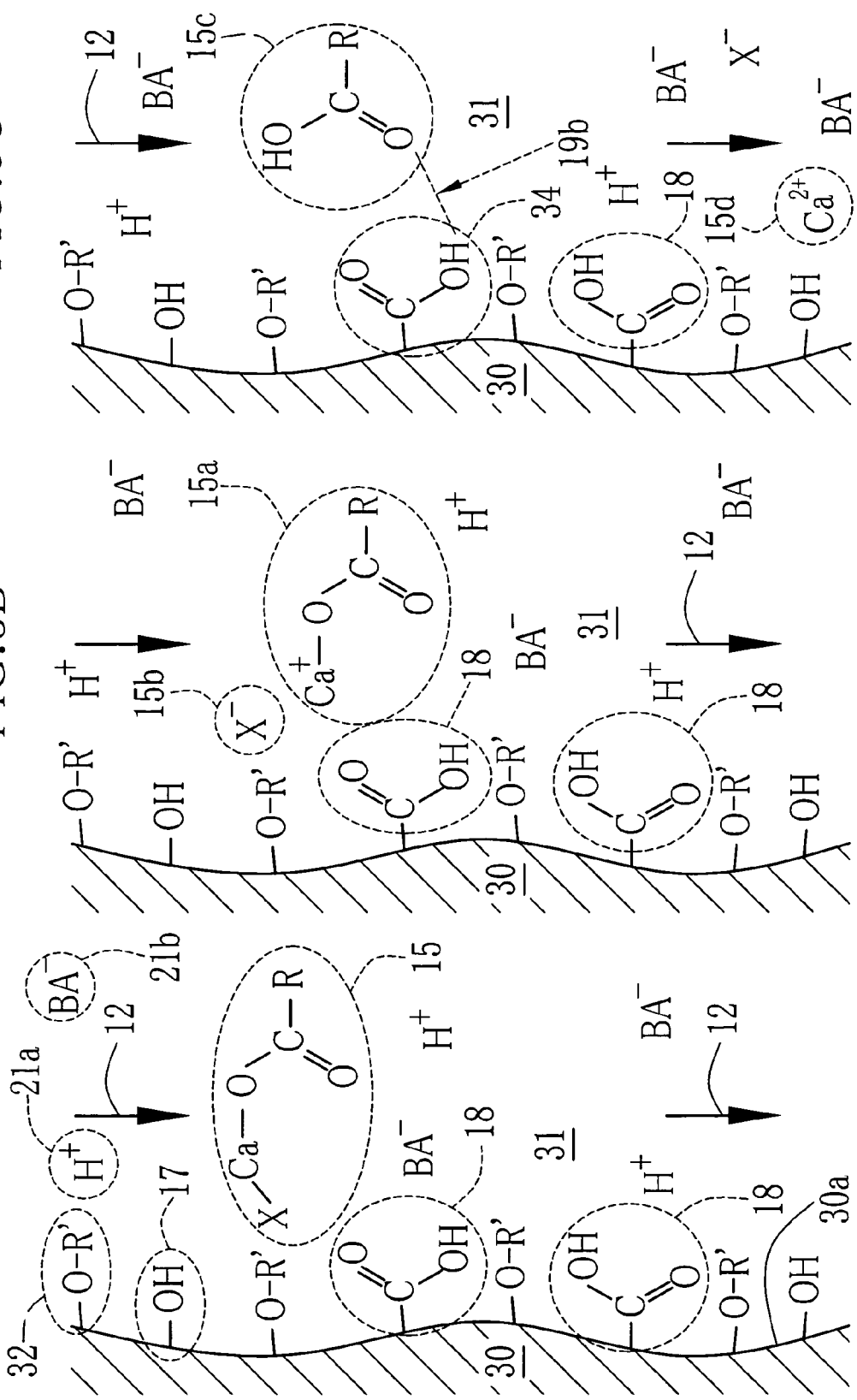

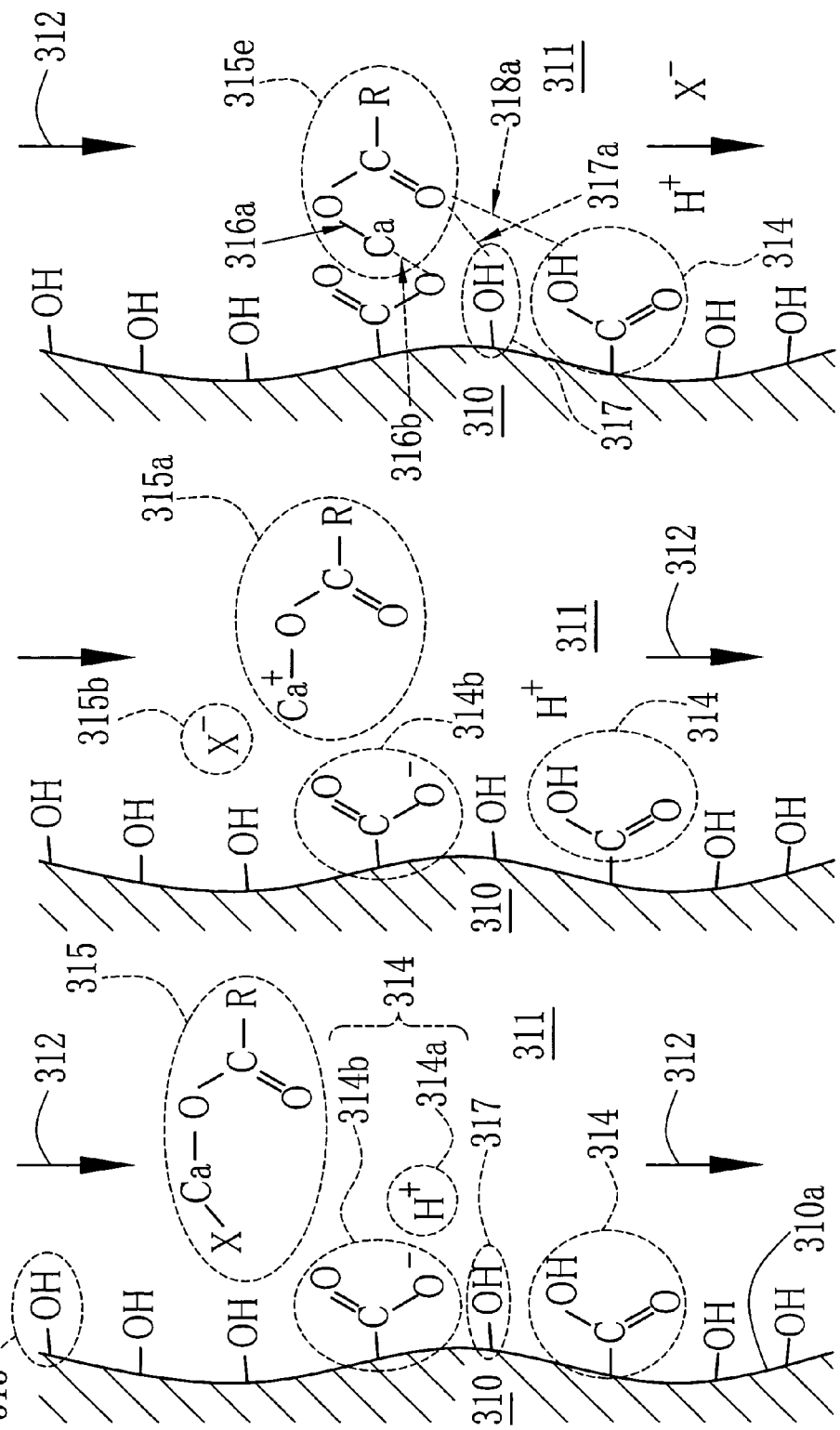

METHODS FOR FILTRATING AND PRODUCING POLYMER SOLUTION, AND FOR PREPARING SOLVENT

This nonprovisional application claims priority under 35 U.S.C. § 119(a) on Patent Application No. 2002-304754 filed in JAPAN on Oct. 18, 2002, which is herein incorporated by reference.

BACKGROUND OF THE INVENTION

1. Field of the Invention

The present invention relates to a method for filtrating and producing a polymer solution, and a method for preparing a solvent.

2. Description Related to the Prior Art

A cellulose acylate film is used as a film base of a photosensitive material since it has strength and flame resistance. In the cellulose acylate film, especially preferable one to the use of the film base is a cellulose triacetate film (hereinafter TAC film) formed of cellulose triacetate having acetyl value from 57.5% to 62.5%. Further, the TAC film is excellent in optical isotropy. Therefore it is adequate to use the TAC film as a color filter, an optical compensation film and a protective film for a polarizing filter in a liquid crystal display whose market becomes larger recently.

The TAC film is produced in a solution casting method. In the solution casting method. A film of the solution casting method is more excellent in optical characters and physical properties than that by other method, such as the melt casting method. In the solution casting method, a polymer is dissolved to a solvent (mainly organic solvent) to produce a polymer solution (hereinafter dope), and the dope is cast on a band or a drum to form the polymer film. The produced polymer film is used as a film base of a photo film or an optical film.

A mixture solvent is often used for preparing the dope. The main solvent of the mixture solvent is usually dichloromethane (called methylene chloride) which is a good solvent of TAC. Further, the mixture solvent contains alcohols, ketones and the like which are poor solvents of TAC. Further, additives are added to the dope in order to obtain the polymer film having a predetermined physical property. The additives are, for example, triphenylphosphate (TPP) and biphenyldiphenylphosphate (BDP). And the mixture solvent usually contains water. The water is originally contained in raw materials of TAC (for example a cotton linter and the like), alcohols or ketones (to which water easily dissolves), or the like. While the dope is fed or processed, the water in the air migrates into the dope.

In order to obtain the polymer film from the dope, the dope is cast on a base. Then, the drying of the dope and the polymer film is made to evaporate a solvent vapor, and the solvent vapor is recovered from the air as a recovery solvent. The recovery solvent is reused for the mixture solvent for preparing the dope. In order to recover to the solvent vapor, there are a condensing method and an absorbing method. The solvent vapor which is evaporated in the drying of the dope and the film is recovered at first in the condensing method, and thereafter the solvent vapor in which is evaporated in a heat-drying process is recovered in the absorb-recovery method, while the heat-drying process is made in a situation of little content of the solvent in the film. In the absorbing method, the solvent vapor is adsorbed to an adsorptive, and then a desorption gas is applied to the adsorptive to remove from the adsorptive the solvent vapor (for example dichloromethane), TAC and decomposition thereof, plasticizer and decomposition thereof, and the like. Thereby, hydrochloric acid is generated from dichloromethane and decompositions thereof. Acetic acid is generated from TAC and decomposition thereof, and phosphoric acid is generated from TPP, BDP and decomposition thereof. As hydrochloric acid and phosphoric acid cause the oxidization of inner surfaces of pipes and tanks, an alkali solution is added to the recovery solvent (or the mixture solvent) so as to neutralize the recovery solvent as described in Japan Institute of Invention and Innovation (JIII) JOURNAL of TECHNICAL DISCLOSURE 2001-1745.

In the dope, there are types of polymers whose raw materials are natural materials. The raw material contains a small amount of substances which are not or hardly dissolved to the solvent. Further, the dope often contains foreign substances or dusts. Originally the former is contained in polymer or other raw materials and the latter is mixed in feeding process or dissolving process of the raw material. Note that undissolved substances are determined in the following description as a general word of an undissolved polymer remaining in the solvent, a polymer in sol-like state in the dope, impurities in the raw materials, and the foreign substances. Usually, the dope contains at least two different sizes of the undissolved substances. The undissolved substances are removed with a filter medium after preparing and before casting the dope to reduce that the produced film has defects. Japanese Patent Laid-Open Publication No. 2000-256477 discloses a method in which a filter medium having micro pore is used for removing the undissolved substances from the dope.

Further, in order to remove all of the undissolved substances, the filter medium has pore smaller than the minimum size of the undissolved substance. In these cases, undissolved substances occlude pore of the filter medium and stop it. Accordingly, the filtering life becomes extremely short. Further, there is sometimes a case in which the filtration pressure applied for filtrating the dope becomes higher in the stop of the pore, which causes the interruption of producing the dope in the dope production line.

However, the dope may contain micro undissolved substances enough to form the excellent film in optical properties and strength and so on. Accordingly, a standard size is determined as a limit of the size of the undissolved substance, in which it has no bad influence on the formed film. In FIGS. 14A-14C, a filter medium 310 for filtrating a dope 312 is formed of cellulose fiber and has a hole 311 of diameter smaller than the standard size. The pore 311 are formed in a feeding direction of the dope 312.

The inventor considers about the phenomena, as shown in FIGS. 14A-14C. FIGS. 14A-14C are temporary situation of the pores of the filter medium. Accordingly, the situations of atomic groups, molecular and ions are not restricted in these figures. In FIG. 14A, there are hydroxyl groups 313, 317 and carboxyl groups 314, 318 in the filter medium 310. Some of carboxyl groups 314 are ionized to generate a hydrogen ion 314a and carboxyl anion 314b. Note that the ratio of the number of the carboxyl group 314 to the hydroxyl group 313 exposed on the pore wall 310a is larger in this figure than in real.

TAC is produced by performing the acetylation of the hydroxyl group. However, as the material of cellulose is natural product, the TAC pellet contains calucium carboxylate, magnesium carboxylate and their derivatives, which form the undissolved substances 315 when the TAC pellet is dissolved to the solvent. Note that the group R in the undissolved substance 315 may be several groups, such as alkyl chain, other functional groups, groups in which substitution of some atoms of the alkyl chain is made. The length of the group R in the undissolvend particle 315 is at least about that of oligomer, as the impurities is originally from the natural materials. And the length of the large undissolved substances may be about that of polymer. Further, the group X is atomic group, such as alkyl chain, functional group, and the like.

As shown in FIG. 14B, the undissolved substance 315 often dissociates to a calcium carboxylate cation 315a and an anion 315b. The calcium carboxylate cation 315a and carboxylate anion 314b forms an ionic bond 316a.

Further, first type hydrogen bonds 317a are formed between the oxygen of C=O bond in the calcium carboxylate cation 315a and the hydroxyl group 317 on the pore wall of the pore 311. The hydrogen bond is originally weak. However, as there are a quite large number of hydroxyl groups on the pore wall, the calcium carboxylate is bound to the pore wall with strong force.

Furthermore, second type hydrogen bonds 318a are formed between oxygen of C=O bond in the calcium carboxylate cation 315a and the hydrogen of the carboxyl group 318. The number of the second type hydrogen bonds 318 is very small. Accordingly, the second type hydrogen bonds 318 hardly causes the adhesion of the foreign substances to the pore wall. Therefore, the effects of the second type hydrogen bonds 318 to the stop of the pore is quite small.

The ionic bond is stronger than the hydrogen bond since being formed with a stronger electric force. Accordingly, the ionic bond 316 may cause the stop of the pore. Further, as the number of the first hydrogen bonds 316a is very large and the total force thereof becomes large. Accordingly, the first hydrogen bond 316a may cause the stop of the pore.

Further, undissolved substances often have a property to form a agglomerate or an association. In this case, the pore is stopped with the agglomerate or the association of the undissolved substances.

In order to neutralize the recovery solvent, sodium hydroxide solution is used since sodium hydroxide is cheap. In this case, however, brown impurities are generated in the dope while the recovery and the neutralization of the mixture solvent is made several times. Sometimes the dope containing the brown impurities is cast on the base, and becomes brown or black foreign material in the produced polymer film. Although other alkali solution is used, this problem cannot be solved, and the effects of production of the polymer film don't become higher. Further, impurities are generated in accordance with hydrogen ion concentration of the mixture solvent (organic solvent) and the dope that contain dichloromethane insoluble to water.

However, the pH value of aqueous solution is measured in a measuring method of the pH value, but that of organic solvent is not measured. Accordingly, neutralization agents are added to the mixture solvent on the basis of the amount the acidic or basic materials. However, in this case, a predetermined amount of the mixture solvent is supplied in a tank for performing the neutralization of the mixture solvent in a batch manner. Accordingly, the hydrogen ion concentration of the mixture solvent cannot be continuously regulated, which reduces the continuous supply of the dope in a film production line.

SUMMARY OF THE INVENTION

An object of the present invention is to provide methods for filtrating and producing a polymer solution or a dope, in which a filter medium is used for a long time.

Another object of the present invention is to provide methods for filtrating and producing a polymer solution or a dope, in which a ionic bond and a hydrogen bond are hardly formed between a filter medium and undissolved substances.

Still another object of the present invention is to provide a method for filtrating and producing a polymer solution or a dope in which an agglomerate or an association of the undissolved substances is hardly formed in a pore of the filter medium.

Still another object of the present invention is to provide to a method for producing a solvent used for the polymer solution, in which it is reduced that black and brown foreign materials are generated in the polymer solution.

Still another object of the present invention is to provide a method for estimating a hydrogen ion concentration of the organic liquid material easily.

In order to achieve the object and the other object, in a method for filtrating a polymer solution with a filter medium, a polymer is dissolved to a solvent to prepare the polymer solution. The filter medium has many pores for trapping undissolved substances of and at least predetermined size. At least one sort of acidic materials is added to the polymer solution before passing the polymer solution through the filter medium.

Further, the filter medium is formed of cellulose fiber. Hydrogen atoms in at least parts of plural hydroxyl groups of the cellulose fiber are substituted to substituents or acidic groups.

In another method for filtrating a polymer solution with a filter medium, a polymer is dissolved to a solvent to prepare the polymer solution. The filter medium is formed of cellulose fiber and has many pores for trapping undissolved substances of an at least predetermined size. Hydrogen atoms in at least parts of plural hydroxyl groups of the cellulose fiber are substituted to substituents or acidic groups.

In a method for preparing a solvent to be used for dissolving polymer to produce a polymer solution, a predetermined volume of water is added to a sample solvent which is sampled from the solvent. The volume of the water is from 0.1 to 10 times as large as that of the solvent. Then dissolved elements in the sample solvent is extracted to the water. Hydrogen ion concentration of the water is measured, and the hydrogen ion concentration of the solvent is adjusted such that the hydrogen ion concentration of the water becomes a predetermined value.

In a producing method for polymer solution, in order to prepare a solvent, a predetermined volume of water is added to a sample solvent which is sampled from the solvent, and the volume is from 0.1 to 10 times as large as that of the mixture. Dissolved elements in the sample solvent is extracted to the water. A hydrogen ion concentration of the water is measured, and a hydrogen ion concentration of the solvent is adjusted such that the hydrogen ion concentration of the water becomes a predetermined value. Thus the solvent is obtained. Thereafter, a polymer is dissolved in the solvent to obtain the polymer solution. The polymer solution is filtrated with a filter medium before producing a film in a solution casting method. Thus undissolved substances having at least predetermined size are removed from the polymer solution.

In a producing method for a polymer film, a solvent is prepared. A polymer is dissolved in the solvent to obtain the polymer solution. An acidic material is added to the polymer solution. The polymer solution is filtrated with a first filter medium. The filter medium has many pores for trapping undissolved substances whose size is at least a predetermined one. Then the polymer solution is cast on a substrate to firm the polymer film. Further, the polymer solution is filtrated with a second filter medium before casting the polymer solution so as to remove from the polymer solution the undissolved substances whose size is at least a second predetermined one.

In a measuring method for hydrogen ion concentration of a solvent which is not dissolved to water, a predetermined volume of water to a sample solvent which is samples from the solvent. The volume is from 0.1 to 10 times as large as that of the sample solvent. Water-soluble elements are extracted from the sample solvent by the water. The water is separated from the sample solvent, and a hydrogen ion concentration of the water is measured.

According to the method of the present invention, as the acidic material is added to the polymer solution to reduce the undissolved substance from adhering to a wall of the pore, the ionic bond and the hydrogen bonds are hardly formed, and a life of the filter medium becomes longer.

Further, as the parts of plural hydroxyl groups are substituted to other functional groups so as to reduce the stop of the pore of the filter medium, and the life of the filter medium becomes longer.

Furthermore, as the parts of plural hydroxyl groups are substituted to other functional groups having properties of acid, so as to reduce the undissolved substances from adhering to a wall of the pore, the ionic bond and the hydrogen bonds are hardly formed, the agglomerate or the association of the undissolved substances are hardly formed, and the life of the filter medium becomes longer.

According to a method for preparing the solvent from the mixture of the present invention, as the acidic or basic liquid is added to the mixture in accordance with the pH value of the water which has been mixed to and thereafter separated from the mixture, the generation of the foreign materials is reduced.

In the present invention, the meaning of the acid contains the Arrhenius' acid, Br$\phi$nsted acid, and Lewis acid.

BRIEF DISCRIPTION OF THE DRAWINGS

The above objects and advantages of the present invention will become easily understood by one of ordinary skill in the art when the following detailed description would be read in connection with the accompanying drawings.

FIG. 2A is an exploded sectional view illustrating models of the first embodiment of a method for filtrating a polymer solution according to the present invention;

FIG. 2B is the same view as FIG. 2A;

FIG. 2C is the same view as FIG. 2A;

FIG. 3A is an exploded sectional view illustrating models of the first embodiment of a method for filtrating a polymer solution according to the present invention;

FIG. 3B is the same view as FIG. 3A;

FIG. 3C is the same view as FIG. 3A;

FIG. 14A is an exploded sectional view illustrating models of the method for filtrating a polymer solution in the prior art;

FIG. 14B is the same view as FIG. 10A;

FIG. 14C is the same view as FIG. 10A.

PREFERRED EMBODIMENTS OF THE INVENTION

Figures 1A, 1B, 1C:
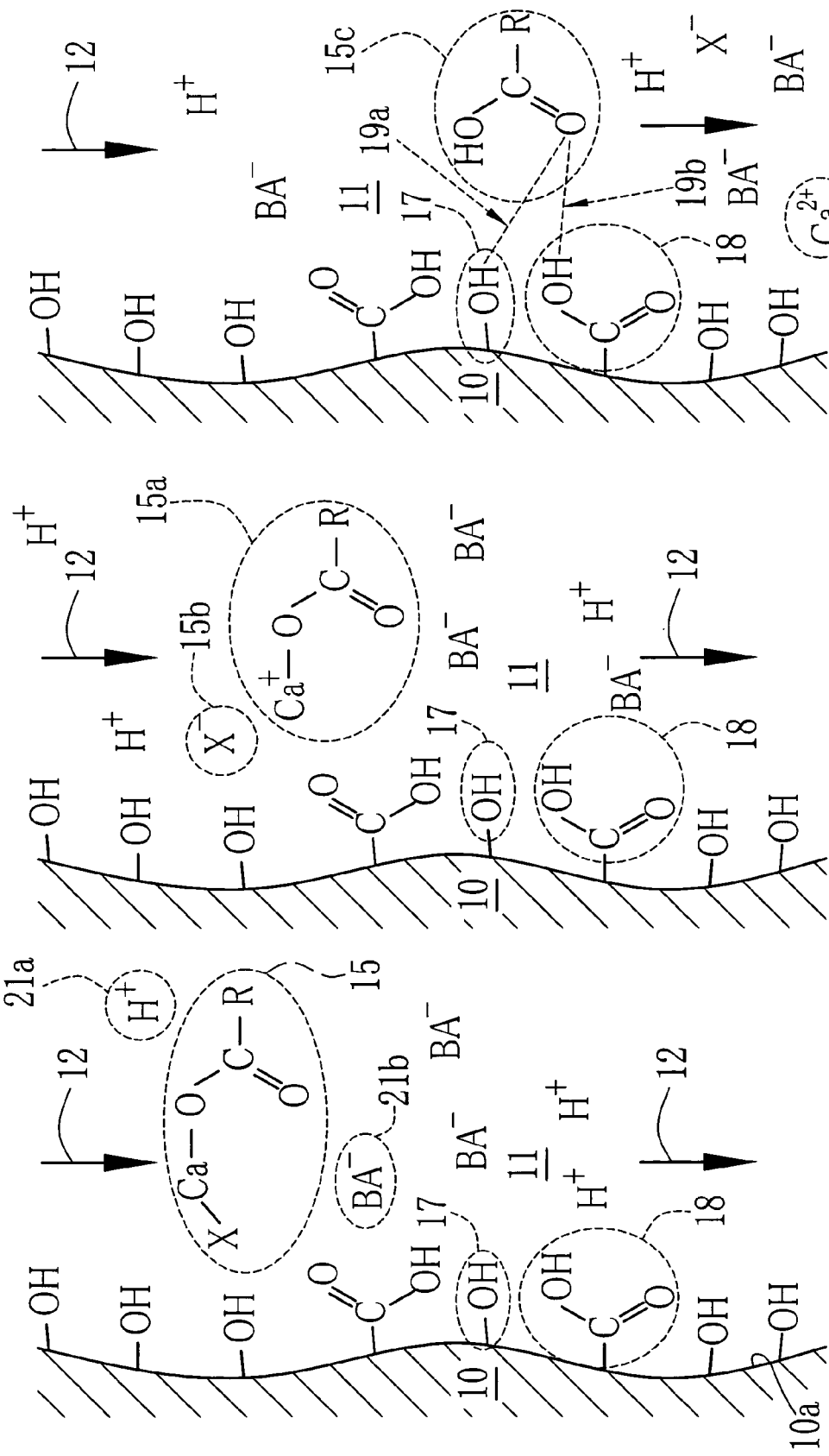
FIG. 1A is an exploded sectional view illustrating models of the first embodiment of a method for filtrating a polymer solution according to the present invention.
FIG. 1B is the same view as FIG. 1A.
FIG. 1C is the same view as FIG. 1A.

A method of filtrating a polymer solution (or dope) of the present invention, a method of producing the polymer solution, and a solution casting method in which the dope is cast to form a polymer film will be explained. At first, the explanation of the materials (polymer, solvent, additives) of the dope is made, and the explanations for the methods of filtrating and producing the dope follow in this order. Further the solution casting method for producing the polymer film from the dope is explained, and at last products in which the polymer film is used are explained.

[Polymer]

The polymers used in the present invention are not especially restricted. Further, in the cellulose ester, it is preferable to use cellulose acylate, particularly to use cellulose acetate. In the cellulose acetate, it is especially preferable to use cellulose triacetate (TAC) whose acetyl value is from 57.5% to 62.5% (degree of substitution is from 2.6 to 3.0). Note that there are cotton linter and wood pulp as raw materials of the cellulose triacetate, and the cotton linter, the wood pulp or the mixture thereof may be used in the present invention. The acetyl value means an acetylation degree in mass of acetic acid combined to be a cellulose acetate molecule. The acetyl value is obtained in accordance with the method for measuring and calculating the acetylation degree in ASTM:D-817-91 (testing method for cellulose acetate and the like).

In an embodiment of the present invention, the cellulose acylate particles may be used. At least 90 wt. % of the cellulose acylate particles has diameter from 0.1 mm to 4 mm, preferably from 1 mm to 4 mm. Further, it is preferable that the ratio of the cellulose acylate particles having diameter from 0.1 to 4 mm is preferably at least 95 wt. % of the cellulose acylate particles, particularly at least 97 wt. %, especially at least 98 wt. %, and most especially at least 99 wt. %. Furthermore, it is preferable that at least 50 wt. % of the cellulose acylate particles have diameter from 2 mm to 3 mm. The ratio of the cellulose acylate particles having diameter from 2 mm to 3 mm is particularly at least 70 wt.

%, especially at least 80 wt. %, and most especially at least 90 wt. %. Preferably, the cellulose acylate particle has a nearly ball-like shape.

The explanation about cellulose acylate used in the present invention will be made. The cellulose acylate is prepared from cellulose. The raw material of the cellulose is, for example, cotton linter, wood pulp, (broad-leaved tree pulp and needle leaved tree pulp), and the like. In the present invention, any sort of celluloses produced from the different raw materials may be used and several sorts of them may be mixed. The detailed description of cellulose is made in "Lecture about Material of Plastics (17), Fiber Resin (Marusawa, Uda, Nikkan Kogyo Shinbun Co., Ltd., 1970)".

The range of molecular weight of cellulose is wide. For example, the molecular weight of natural cellulose is 600,000-1,500,000 (degree of polymerization is about 3,500-10,000), that of purified linter is 80,000-500,000 (degree of polymerization is 500-3,000), the molecular weight of wood pulp is 80,000-1,340,000 (degree of polymerization is 500-2,100). Herein, the molecular weight has a large influence on strength of cellulose and derivatives thereof. When the molecular weight becomes smaller and the degree of polymerization is less than a certain value, then the strength becomes smaller.

In the present invention, cellulose is esterified to cellulose acylate. Thereby the linter and the pulp is purified as the raw material and thereafter esterification is preformed. The linter is the shorter cotton fibers in the cotton ball, contains the large amount of the $\alpha$-cellulose (for example in the range of 88% by mass to 92% by mass), and has high purity with small amount of impurities. The crude linter is purified so as to remove the impurities. As the refinement, there are treatments, for example, the boiling in the alkali solution, the bleaching, the acid treatment, dehydration and dry are made such that the purified linter is obtained. The detailed description is made in the above publication (Maruzawa, Uda, 1970), page 25-28, and tables 2-3 show characteristics of the purified linter.

Further, the detailed description is made in the page 28-32 of the publication, and tables 2, 4 show characteristics of the purified pulp. The purified pulp obtained in any method is preferable for the raw material. It is also preferable to mix the purified cotton linter and the wood pulp, and the ratio of the mixture is not restricted especially. Only one of themmay be used. When the mixture is made, the solubility may become larger, and the condition of surface of cellulose acylate film, mechanical property and optical property are improved.

The analysis of the cellulose used in the present invention is made in any method. The detailed explanation about the analysis stands in ASTM standard Part 15. TAPPI Standard (Technical Association of the Pulp and Paper Industry) or JIS P8101 and the like. The analysis is made in the following points: contents of ash content, calcium oxide, magnesium oxide, $\alpha$-cellulose and $\beta$-cellulose, and copper number.

The content of $\alpha$-cellulose is a criterion of purification of the pulp, and can be selected, for example in the range of 80% by mass to 100% by mass, and 85% by mass to 98% by mass in the wood pulp. In the present invention may be used the pulp of low purification that contains $\alpha$-cellulose of 80% by mass-96% by mass (particularly 92% by mass-96% by mass). Note that the cellulose acylate film produced from the broad-leaved tree as the raw material cannot easily peeled from a substrate in a film production line (described below). Further, and the optical properties (such as transparency) become worse in the cellulose acylate film produced from the needle-leaved tree as the raw material. However, these cellulose acylate films are used for optical used or the photo film without any problems.

In the present invention, as described in Japanese Patent Laid-Open Publication No. 11-130301, the neutral sugar component in the pulp or the cotton is mainly glucose, and may include mannose or xylose. The ratio between mannose and xylose is not restricted. But it preferably mannose/xylose (ratio in mol)=0.35/1-3.0/1, particularly 0.35/1-2.5/1, especially 0.35/1-2/1. In this case, the total content of mannose and xylose in cellulose triacetate is 0.01 mol %-5 mol %, preferably 0.1 mol %-4 mol %. Note mannose, xylose is a main sugar constituting hemicellulose (xylane, glucomannan) contained in the pulp. The Japanese Patent laid-open Publication No. 11-130301 teaches a method of analyzing the sugar components in cellulose acylate (especially cellulose triacetate) and the pulp as the raw material.

One of methods for structure analysis of cellulose is X-ray crystal structure analysis method. The above publication teaches that cellulose molecules orient along a fiber axis, and forms hydrogen bond to draw each other, and that cellobiose groups, which are contained in respective five cellulose molecules, form one unit cell. Note that in the X-ray analysis, the crystallization degree of the natural cellulose is about 70%. These cellulose is used for preparation of cellulose acylate in the present invention.

It is preferable to use as the above cellulose acylate the cellulose acylate described in the Japanese Patent Laid-Open Publications No. 10-45803, 11-269304, 8-231761, 10-60170, 9-40792, 11-5851, 11-269304, 9-90101, 57-182737, 4-277530, 11-292989, 12-131524, 12-137115 and the like. Note that the present invention is not restricted in the descriptions of the above publications, when the non-chloride organic solvent is used for producing the cellulose acylate film.

The following description is according to cellulose acylate of the present invention that is prepared from the above cellulose as the raw material. In order to prepare the cellulose acylate, cellulose is acylated such that hydrogen atoms of the hydroxyl group are acylated. Thereby the degree of the substitution preferably satisfies all of the following formulae (I)-(III):

$$2.6 \leq A+B \leq 3.0 \tag{I}$$

$$2.0 \leq A \leq 3.0 \tag{II}$$

$$0 \leq B \leq 0.8 \tag{III}$$

In these formulae, A is a degree of substitution of the hydrogen atom to the acetyl group, and B is a degree of substitution of the hydrogen group to the acyl group having 3-22 carbon atoms. One glucose unit of cellulose has three hydroxyl groups, and the formula (I) determines the region of the degree of substitution of hydrogen atoms on these three hydroxyl groups, and the maximum of this degree of substitution is 3.0. Usually, the degree of substitution A is 2.6-3.0, and in this case, the hydrogen atoms on the hydroxyl group remain at ratio of at most 0.4. Further, when B=0, then cellulose triacetate is obtained. The cellulose acylate is preferable cellulose triacetate in which the all of acyl group is acetyl group. Further, it is preferable that the degree of substitution A is at least 2.0, the degree of substitution B is at most 0.8, and the ratio of the remaining hydroxyl group is at most 0.4. The degree of substitution B is preferably at most 0.3 in view of physical properties. Note that the degree of the binding of the fatty acids having 3-22 carbon atoms is measured, and the degree of substitution is calculated from the data of the measurement. The measurement of the degree of substitution is made on the basis of ASTM D-817-91.

Note that when all of the acyl groups is acetyl group, the degree of substitution is represented with a acetyl value. In cellulose acetate, the average acetyl value is preferably 58% to 62.5% in accordance with use and properties (averaged degree of substitution of acetyl group is preferably 2.64-3.0). The particularly preferable degree of substitution is about 59%-62% (for example about 60%-61%). Concretely, 1.9 g of dried cellulose acetate is measured and dissolved to 150 ml of a mixture solvent of acetone and dimethylsulfoxide (4:1 in ratio of volume). Thereafter, 30 ml of 1N-NaOH aqueous solution, and then saponification is performed at 25° C. for two hours. Phenolphthalane is added as an indicator, and $1N-H_2SO_4$ is titrated to neutralize the excess NaOH. Note that the blank test is made in the same method, and the acetyl value is calculated in the following formula:

Acetyl Value (%)=[6.5×(B−A)×F]/W (in the formula, A is a volume (ml) of the titrated $1N-H_2SO_4$ to a estimation material of the cellulose acylate, and B is a volume (ml) of the titrated $1N-H_2SO_4$ in the blank test. F is a concentration factor of $1N-H_2SO_4$, and W is weight of the sample.)

It is preferable in the present invention that the percentage of the hydroxide groups at C-6 which are substituted to the acyl groups is least 32%, particularly at least 33%, and especially 34%. The degree of substitution at each position is measured with an NMR spectrometer. Preferably, the hydroxyl group at 6-position may be substituted to other acyl group having at least 4 carbon atoms, for example propionyl group, butyroyl group, valeroyl group, benzoyl group, acriloyl group and the like.

In the present invention, the acyl group of the cellulose acylate may contain fatty group or aryl group, and is not especially restricted. Therefore, cellulose acylate may be alkylcarbonyl ester, alkenylcarbonylester, or arylcarbonyl ester, arylalkyl carbonyl ester, and the like. Otherwise, the substitution may be further made so as to have ester groups in which the number of carbon atoms is preferably at most 22. The preferable cellulose acylate has the acyl group having at most 22 carbon atoms (acetyl group, propionyl group, butyroyl group, valeryl group, heptanoyl group, octanoyl group, decanoyl group, dodecanoyl group, tridecanoyl group, hexadecanoyl group, octadecanoyl group and the like), allylcarbonyl group (acryl group, methacryl group, and the like), arylcarbonyl group (benzoyl group, naphthaloyl group and the like), cynnamoyl group. Particularly preferable cellulose acylate is cellulose acetate, cellulose acetate propionate, cellulose acetate butylate, cellulose acetate stearate, cellulose acetate benzoate, and the like. When plural esters are mixed, the ratio of the mixture is not especially restricted. However, it is preferable that the ratio of the acetate group is at least 30 mol % in the total esters.

Cellulose acylate is preferable among the above esters, and it is especially preferable to use is for the photographic use. The cellulose acylate for the photographic use in the market has high quality with satisfying the average viscometric degree of polymerization, degree of substitution and the like. The cellulose acetate preferable to the photographic products is produced by Daisel Chemical Industries, Ltd. (LT-20, 30, 40, 50, 70, 35, 55, 105 and the like), Eastman Kodak Company (CAB-551-0.01, CAB-551-0.02, CAB-500-5, CAB-381-0.5, CAB-381-02, CAB-381-20, CAB-321-0.2, CAP-504-0.2, CAP-482-20, CA-398-3 and the like), Courtaulds PLC, Hoechst AG, and the like.

(Method of Producing Cellulose Acylate)

The explanation of method of producing cellulose acylate which is most especially preferable in the present invention will be made. However, other sorts of esters of cellulose are produced in the same method. The general explanation about cellulose acetate is made in the publication (Maruzawa, Uda, 1970), Page 54-107. The sorts described in this publication are also used preferably.

The method of producing cellulose acetate is not restricted. For example, there are an acetic acid method, methylene chloride method, methods in which sulfuric acid is used as catalyst, and the like. At first, in an activating process, acetic acid is applied to linter and pulp of the cellulose material. Then, acetylation is performed between cellulose and acetic acid anhidrine with use of sulfuric acid as the catalyst. Thus, the cellulose triacetate is produced. Further, after the hydrolysis, the aging, the precipitation, the purifying and the drying, cellulose triacetate is obtained, so as to have the predetermined acetyl value. In the activating process, the pulp (cellulose) is processed by dipping into or spraying with acetic acid or acetic acid containing water. The amount of the acetic acid, to 100 pts.wt. of the pulp, is 10-100 pts.wt., preferably 20-80 pts.wt., especially 30-60 pts.wt. The amount of the acetic acid anhidrine for acetylation process, to 100 pts.wt. of the pulp (cellulose), is 230-300 pts.wt., preferably 240-290 pts.wt., expecially 250-280 pts.wt. Generally for the acetylation, acetylic acid is used as the solvent. The amount of the acetic acid thereby, to 100 pts.wt. of pulp (cellulose), is 200-700 pts.wt., preferably 300-600 pts.wt., especially 350-500 pts.wt. As catalyst in the acetylation or the aging, the sulfuric acid is used, and the amount thereof to the 100 pts.wt. of cellulose is 1-15 pts.wt., preferably 5-15 pts.wt., especially 5-10 pts.wt.

In order to improve the optical properties, treatment of the obtained cellulose acetate with an oxidation agent is made in an adequate one of the producing processes of the cellulose acetate, for example, after acetylation or saponification. Note that, the treatment of the oxidation agent is effectively made, regardless of the amount of the acetic acid used for performing the acetylation. However, when the amount of the acetic acid as the solvent in the acetylation is large, then the optical properties are improved more. The oxidation agent is peroxy acid (for example, hydrogen peroxide, performic acid, peracetic acid, perbenzoic acid, lauroyl peroxide, benzoil peroxide and the like), organic peroxide compounds (for example, diacetyl peroxide). The number of sorts of the oxidation agents to be used is not one but may be at least two. The preferable oxidation agent is easily removed from cellulose acetate and hardly remain in cellulose acetate. For example, there are hydrogen peroxide, performic acid, peracetic acid. The especially preferable hydrogen peroxide and peracetyc acid. The amount of the oxidation agent is determined depending on required level of the optical properties. The amount to 100 pts.wt. of cellulose acetate is, for example, 0.01 pts.wt.-5 pts.wt., preferably 0.1 pts.wt.-2.5 pts.wt., particularly 0.1 pts.wt.-1 pts.wt. The treatment of the oxidation agent is performed at 20° C.-100° C., preferably 30° C.-70° C. Further, the temperature of the saponification and the aging is not restricted, but 40° C.-90° C., preferably 50° C.-80° C.

During performing the precipitation, the poor solvent of cellulose acylate is added to the reacting solution. The poor solvent is water, alcohol (methanol, ethanol, propanol, butanol and the like), acetone and the like. Thus the solid of cellulose acylate is obtained as precipitation. Thereafter the refining of the solid of cellulose acylate is usually performed by cleaning. It is preferable thereby to use the poor solvent as a cleaning liquid. Whether the cleaning is enough or not, it is discriminated by measuring the pH value of the cleaning liquid. When the cleaning is not enough, then the pH value of the cleaning liquid is in the acid region. Preferably, the solids of cellulose acylate are particles having diameter of at most 10 mm in the cleaning. Accordingly, when the solid size is large, the particles of cellulose acylate are crushed with a crushing agitator and the like before the cleaning. Note that when the acyl group has a long chain alkyl group, then the hexane may be used as the cleaning liquid.

The drying is necessary to produce cellulose acylate. The drying methods are not restricted. In the present invention, at first, the solid thereof is set on a base which is moved by feed rollers in a direction. And when the base is moved, an air is blown. And the drying may be done at the same or less than the normal pressure. When the pressure is less than the normal temperature, it is preferable less 100-50,000 Pa, and particularly 1,000-30,000 Pa. The pressure can be made lower with a water-jet pump or mechanically. The drying temperature is selectively set to 30° C.-250° C. Thereby, when it is designated that the solid or the particles of cellulose acylate may have temperature of 30° C.-250° C., then the air blown having the high temperature is blown to the solid of cellulose acylate, and the feed roller may be heated. Otherwise, the solid of cellulose acylate can be dried in application of supersonic wave or electron beam. The time of the drying is preferably short in view of the productivity, for example, 0.1 hours-1000 hours, particularly 1 hours-100 hours.

Further, in order to increase the stability of cellulose acylate, the heat stabilizer, for example alkali methal salts (potassium salts, sodium salts and the like), alkali earth metal salts (calcium salts, magnesium salts, strontium salts, barium salts and the like) may be added to the obtained cellulose acylate. The amount of the anti-heat stabilizer is not restricted. However, the content of the alkali metal or alkali earth metal in the salts to cellulose acylate is preferably 1 ppb-10,000 ppm, particularly 10 ppb-1,000 ppm, especially 50 ppb-500 ppm. Further, other metals (heavy metal, for example, iron, zinc, tin, lead, nickel, cupper and the like) may be contained in cellulose acylate. The content of iron to cellulose acylate is preferably at most 1000 ppm, and particularly at most 100 ppm, especially at most 20 ppm, most especially at most 1 ppm. Further, the content of other metals is preferably at most 1000 ppm, and particularly 100 ppm.

(Preferable Characteristics of Cellulose Acylate)

The average viscometric degree of polymerization of cellulose acylate used in the present invention is 200-700, preferably 250-550, particularly 200-400. The average viscometric degree of polymerization is measured in a limiting viscosity method (Sen'i Gakkaishi, vol 18 No. 1, Page 105-120, Kazuo Uda, Hideo Saito, 1962). Further, the Japanese Patent Laid-Open Publication No. 9-95538 teaches the limiting viscosity method. The average viscometric degree of polymerization (DP) is calculated in the following formula from an intrinsic viscosity $[\eta]$ of cellulose acetate that is measured with an Ostwald Viscometer.

$$DP=[\eta]/Km \quad (a1)$$

In the formula (a1), Km is a constant number $6 \times 10^{-4}$. When the average viscometric degree of polymerization (DP) is at least 290, it is preferable that the average viscometric degree of polymerization (DP) and condensed solution viscosity ($\eta$) satisfies the following formula (a2).

$$2.814 \times \ln(DP) - 11.753 \leq \ln(\eta) \leq 6.29 \times \ln(DP) - 31.469 \quad (a2)$$

The average viscometric degree of polymerization (DP) is the passing time (sec) through between gauge lines and at least 290. The condensed solution viscosity ($\eta$) is measured with a falling ball viscometer. The formula (a2) is worked out by plotting the graph of the relation between the average viscometric degree of polymerization (DP) and the condensed solution viscosity ($\eta$) In cellulose acetate satisfying the formula (a2), the condensed solution viscosity ($\eta$) increases in a proportional manner to the average viscometric degree of polymerization (DP). Note that the condensed solution viscosity ($\eta$) generally increases in an exponential manner to the average viscometric degree of polymerization (DP), when the average viscometric degree of polymerization (DP) is at least 290 in cellulose acylate.

It is preferable in cellulose acylate used in the present invention that the molecular weight distribution Mw/Mn which is measured by gel permeation chromatography is small, while Mw is weight average molecular weight and Mn is number average molecular weight. Concretely, the value of Mw/Mn is preferably 0.8-11.0, particularly 1.5-8.0, and especially 2.0-7.0.

Further, there is often a small number of cellulose acylate molecules having low molecular weight. In this case, cellulose acylate satisfies the relation between the condensed solution viscosity ($\eta$) and the average viscometric degree of polymerization (DP), and has uniformity since molecular weight distribution of Mw/Mn or the range of heat of crystallization becomes smaller. Furthermore it is effective in the present invention that the number of such cellulose acylate molecules is small, since the molecular weight distribution Mw/Mn becomes small or heat of crystallization is nearly constant in spite of high molecular weight.

The low molecular weight cellulose can be removed by cleaning with an organic solvent. As such organic solvent, there are ketones (for example acetone), acetic esters (for example methyl acetate), and cellosolves (for example methyl cellosolve). In the present invention, it is preferable to use ketones, especially acetone. When the first cleaning of cellulose acylate is made with such organic solvent, the low molecular weight cellulose acetate is removed in the range of about 5 wt. %-15 wt. % to the raw material. Preferably the cleaning is performed several times until the percentage of the removed low molecular weight cellulose acylate becomes at most 5 wt. % to the raw material. In order to remove the elements of low molecular weight more effectively, the particles of cellulose acetate are crushed or shieved such that the size of the particles may be regulated. Concretely, it is preferable that at least 70% of the particles may pass through a filter of 20 mesh. Further, the washing may be performed in a method of circulating the organic solvent with a Soxhlet apparatus and the like. Otherwise, after the stirring of cellulose acylate with the organic solvent in a stirring vessel, cellulose acylate may be separated as a solid from the organic solvent.

In order to produce cellulose acetate in which there is small amount of the molecules of low molecular weight, it is preferable that the amount of the sulfuric acid uses as catalyst in acetylation reaction to 100 pts.wt. of cellulose is 10 pts.wt.-15 pts.wt. When the amount of the catalyst is in this region, the cellulose acetate having the preferable or constant molecular weight distribution can be obtained.

Cellulose acylate used in the present invention may contain at least one sort of acid, or alkali metal salt or alkali earth metal salt of the acid, while the acid has the acid ionization constant pKa in an aqueous solution is 1.93-4.50. When the salt is contained, the total amount of alkali metal and alkali earth metal in 1 g of cellulose acylate is preferably $1 \times 10^{-8}$ to $5.5 \times 10^{-6}$ in ion equivalent. In this case, at least several ones of carboxyl groups in cellulose acylate (or hemicellulose acylate) are ionized to have character of acid.

Water content of cellulose acylate used in the present invention is preferably at most 2% by mass, particularly at most 1% by mass, especially at most 0.7% by mass. However, the water content of cellulose acylate is usually 2.5% by mass-5% by mass. Accordingly, in order to obtain cellulose acylate satisfying the above conditions of the present invention, it is necessary to dry cellulose acylate. And a method of drying is not restricted when the water content becomes predetermined value. For example, cellulose acylate is heated in a drying machine, or an air of high temperature is blown. Further, when the pressure is low, the drying may be made in a low temperature under reduced pressure. The temperature of drying is preferably 50° C.-150° C., particularly 70° C.-120° C. When it is designated to perform the drying under reduced pressure, then the pressure is preferably 1 Pa-0.05 MPa, particularly 10 Pa-0.02 MPa, and especially 50 Pa-0.01 MPa. Further, in order to dry cellulose acylate, a drying agent may be used so as to absorb water. Thus the water content in cellulose acylate becomes lower to the predetermined value in the present invention. Note that the time for drying is not restricted. However, the time is determined so as to obtain cellulose acylate of the predetermined water content. The water content of cellulose acylate is measured in Karl-Fischer method. Thereby predetermined mass of the cellulose acylate is used.

In cellulose acylate of the present invention, Yellowness Index (YI) which is index of visual rating of yellowness is, for example, 0.1-10, preferably 0.1-7, Haze is 0.05%-5%, preferably 0.051%-2%, and transparency is 60%-100%, preferably 80%-100%, and particularly 85%-100%. Methods for measuring YI, Haze, and Transparency will be explained.

(Yellowness Index (YI) of Cellulose Acylate)

12.0 g of dried cellulose acylate is measured and thereafter dissolved in 88.0 g of a mixture solvent in which methylene chloride and methanol are mixed in weight ratio of 9:1, so as to obtain 12% by mass of cellulose acylate solution. Thereby, respective Yellow Indexes YI1, YI2 of the mixture solvent and the cellulose acylate soluion is measured with a colorimeter (Colorimeter Σ90, produced by Nippon Denshoku Industries Co., Ltd.) and glass cell (45 mm of width, 45 mm of height, 10 mm of optical pass length). Then, YI is calculated in a following formula:

$$YI = YI2 - YI1$$

(Haze of Cellulose Acylate)

The mixture solvent of methylene chloride and methanol in weight ratio of 9:1 in the above glass cell is set to a Haze/Turbidimeter (produced by Nippon Denshoku Industries Co., Ltd.) to make a zero point adjustment for the measurement. Thereafter, the cellulose acetate solution of 12 wt. % in the above glass cell is set to the Haze/Turbidimeter, and a value indicated by the Haze/Turbidimeter is read as Haze.

(Transparency of Cellulose Acylate)

8.0 g of dried cellulose acylate is measured and thereafter dissolved in 125.3 g of a mixture solvent in which methylene chloride and methanol are mixed in weight ratio of 9:1, so as to obtain 6% by mass of cellulose acylate solution. In order to obtain the transparency, an AKA photoelectric colorimeter having a cesium phototube and a filter No. 12. The mixture solvent of methylene chloride and methanol in weight ratio of 9:1 is fed in a glass cell in which optical pass length is 100 mm, and set to the AKA photoelectric colorimeter. The transparency measured thereby is set to an optical blank. Thus, the transparency of the mixture solvent is set to 100%. Thereafter, the cellulose acylate solution of 6 wt. % is fed into the glass cell and set to the AKA photoelectric colorimeter. Then the transparency of the cellulose acylate solution relative to that of the mixture solvent is measured.

(Thermophysical Properties of Cellulose Acylate)

Preferably, cellulose acylate of the present invention has a glass transition temperature (Tg) from 70° C.-200° C., particularly, 100° C.-180° C. Generally, the Tg of cellulose triacetate is about 150° C.-170° C., which are slightly influenced by acetylation degree and degree of polymerization. When the Tg is too low, cellulose acylate loses the mechanical endurance in the high temperature for using. When the Tg is too high, the solubility of cellulose acetate may be decreased, or the produced cellulose acylate film is easily damaged.

The heat of crystallization of cellulose acylate in the present invention is not restricted. Cellulose acylate whose crystallization degree is too small easily dissolves to the solvent, and the obtained cellulose acylate solution can easily used for the mold and the formation of the cellulose acylate film. However, in this case, the cellulose acylate film is not strong. The heat of crystallization of cellulose acylate from a situation of dissolving is 2 J/g-20 J/g, preferably 3 J/g-18 J/g, particularly 3.5 J/g-15 J/g. The heat of crystallization (ΔHcr) of cellulose acylate is estimated as follows. Cellulose acylate is dissolved in a mixture solvent prepared in weight ratio of dichloromethane/ethanol=9/1, so as to obtain 13% by mass of cellulose acylate solution. Thereafter the cellulose acylate solution is filtrated with a filter whose diameter of the pore is 10 μm. During the filtration, a filtration pressure of 0.5 kgf/cm² is applied. Thus the dope is obtained and fed to a coater. The coater casts the dope onto a glass plate, on which the dope is dried at 35° C. for 20 minutes to form a cellulose acylate film. The cellulose acylate film is peeled from the glass plate, and the vacuum drying of the cellulose acylate film is made at 100° C. for 0.5 hour. Then, 10 mg of the cellulose acylate film is cut as a sample, and placed in a standard aluminum pan, which is set on a sample stage of a differential scanning calorimeter of thermal compensation type (DSC). Then the sample is heated and melted at the preferable temperature in a short time, and crystallized in 4° C./min of cooling rate so as to have the room temperature. Thereby a DSC curve is obtained, the heat of crystallization (ΔHcr) is obtained from sized of peaks of heat. The measurement with the DSC is made in nitrogen atmosphere, and the temperature calibration thereby is in made at two points of In (melting poing at 156.60° C.) and Sn (melting point at 231.88° C.). Further, the analyzing method of the temperature of crystallization is based on JIS K 7121-1987, and the analyzing method of heat of crystallization is based on JIS K 7122-1987.

Cellulose acylate in the present invention has high moisture resistance, high dimensional stability and high acetyl value. However, because of heat of crystallization described above, cellulose acylate easily dissolves in the solvent, and the cellulose acylate solution has low viscosity and easily forms the cellulose acylate film in a high speed. Cellulose acylate of the present invention has low crystallizability. Accordingly, cellulose acylate is used for the molding while the moldability is kept. Therefore, molding articles are effectively obtained. In order to produce the cellulose acylate film, several type of cellulose acylate is used, for example, powder, pellet and the like. Generally, the cellulose acylate solution (dope) is prepared.

[Solvent]

The main solvent used in the present invention may be organic solvent of chlorine or nonchlorine type. The organic solvent of chlorine type usually means hydrocarbone halide compounds, whose representative example is dichloromethane (methylene chloride) and chloroform. However, the present invention is not restricted in them. It is especially preferable in the present invention to use a mixture solvent containing dichloromethane from 70 wt. % to 90 wt. %, and alcohols and ketons from 10 wt. % to 30 wt. %. Further, when it is designated that the organic solvent of chlorine type is used as the main solvent, then the content ratio between the organic solvent of chlorine type (dichloromethane) and the other solvents (alcohols) is not restricted in the above description. Further, only the organic solvent of the chlorine type may be used.

As the organic solvent of nonchlorine type, there are, for example, esters, ketones, ethers, and alcohols. However, the present invention is not restricted in them. The purification of the solvents may be that in the market. Note that the one sort of the solvents may be used, namely 100 wt. % of the solvent of the dope may be the one sort of the organic solvent of the nonchlorine type. Otherwise the solvent of the dope may be a mixture solvent of esters, ketones, ethers, and alcohols having the number of carbon atoms until 6. In the esters, there are, for example, methyl acetate, methyl formate, ethyl acetate, amyl acetate, butyl acetate and the like. In ketones, there are, for example, acetone, methylethyl ketone, cyclohexanone and the like. In ethers, there are, for example, dioxane, dioxolane, tetrahydrofrane, diethylether, methyl-tert-butylether, and the like. In alcohol, there are, for example, methanol, ethanol, 1-butanol and the like. Note that a mixture of the organic solvents of chlorine and nonchlorine types may be used in the present invention.

In the present invention, it is preferable to use a mixture solvent containing the methyl acetate from 70 wt. % to 90 wt. %, acetone from 5 wt. % to 15 wt. %, and alcohol (especially methanol, 1-butanol) from 5 wt. % to 15 wt. %. However, when it is designated that the organic solvent of nonchlorine type is used as the main solvent, then the content of the organic solvent of chlorine and the other solvents are not restricted in the above description.

[Additives]

As additives used in the present invention, there are plasticizers and ultraviolet absorbing agents (containing ultraviolet stabilizer). As the plasticizers, for example, there are phosphoric acid esters (for example, triphenyl phosphate (herein after TPP), tricresylphosphate, cresyldiphenyl phosphate, octyldiphenyl phosphate, diphenylbiphenyl phosphate (hereinafter BDP), trioctyl phosphate, tributyl phosphate and the like), phthalic acid esters (for example, diethyl phthalate, dimethoxyethyl phthalate, dimethyl phthalate, dioctyl phthalate, and the like), glycolic acid esters (for example, triacetin, tributyrin, butylphthalylbutyl glycolate, ethylphthalylethyl glycolate, methylphthalylethyl glycolate, and the like), and other plasticisers.

As the ultraviolet absorbing agent, there are, for example, oxybenzophenone based compounds, benzotriazol based compound, salicylates based compounds, benzophenone based compounds, cyanoacrylate based compounds, nickel complex salt based compounds, and the like. Especially preferable ones are benzotriasol based compounds and benzophenone based compounds.

Further, the dope may contain several sorts of other additives, such as mold lubricant, peeling agent, hydrophobic agent, fluorine based surfactant. These additives may be added before or after production of the dope.

[Method for Filtrating Dope]

In the present invention, the undissolved substances of the raw material having the smaller size than the standard size hardly adhere to the pore wall of the filter medium, such that the life of the filter medium becomes longer. In order to reduce the undissolved substance smaller than standard size from remaining in pore of the filter medium, there are following four methods: (1) adding the acidic material into the dope materials (Note that the acidic material is determined as a material which has characters of acid in the dope); (2) performing a substitution of a functional group on a pore wall of the filter medium into another functional group which hardly causes hydrogen bond with the undissolved substances; (3) performing the combination of processes of (1) and (2); and (4) performing a substitution of a functional group on the pore wall of the filter medium into another functional group which have character of acid. In the present invention, the determination of the acid, the acidic material, and the acidic group is based on the determinations of acids of Arrhenius, Brønsted and Lewis. Note that the explanations of the processes (1)-(4) are made in reference with FIGS. 1A-4C. These figures are temporary situation of the pores of the filter medium. Accordingly, the situations of atomic groups, molecular and ions are not restricted in these figures.

[Filter Medium]

It is preferable that the filter medium is formed of fiber so as to have larger surface area. The sort of the fiber is not restricted. However, there are natural fiber (for example cellulose fiber and the like), regenerated fiber (biscose rayon), semi-synthetic fiber (for example acetate fiber), synthetic fiber (for example, polyester fiber, acryl fiber, polyamide fiber, polyester fiber), metallic fiber (for example stainless fiber) and the like. The present invention is not restricted in them. However, the cellulose fiber is preferably used in order to easily perform the processes of (2)-(4). Only the one sort or combination of plural sorts of the fibers may be used as the filter medium. Note that the form of the filter medium is not restricted in the fiber.

[Standard Size of Undissolved Substances]

The standard size is determined as a limit of a size of the undissolved substances so as not to make a bad influence on the produced polymer film. The standard size is preferable from 1 μm to 10 μm, but may be determined depending on use of the produced film. Namely, the size of the undissolved substance to be removed from the dope depends on the use of the produced film. Accordingly, the standard size is not restricted in the above range. Preferably, the undissolved substances having at least standard size are removed by using the filter medium used in the present invention. The size of the undissolved substances is the largest diameter of molecule or atomic group.

The inventors consider that the following phenomenon and reactions would occur in the above methods (1)-(4):

(1) Adding Acidic Material into Dope

When TAC is used as the polymer, the undissolved substance of the material under the standard size is mainly calcium carboxylate, magnesium carboxylate and derivative thereof. In the conventional method for filtrating the dope, these undissolved substances under the standard size are the cause of stopping the pore of the filter medium. However, the undissolved substances under the standard size, which may often contain agglomerate or association formed of plural molecular, hardly have influences on the optical properties of the produced film, as their size is very small. Accordingly, such undissolved substances under the standard size may be not removed from the dope. In this case, the life of the filter medium becomes longer. It is to be noted in the present invention that the undissolved substances are not only reduced from adhering to the pore wall of the pore of the filter medium. But other elements may reduce from stopping the pore. For example, the undissolved substances often form agglomerate as the undissolved substance. The agglomerate has the larger size than the molecule so as to easily stop the pore. Accordingly, when the agglomerate is prevented, it can be also reduced to stop the pore.

Preferably, the above acidic material is dissolved in water, and the ionization constant (pKa) of the aqueous solution at most 4.8 at 25° C. Note that when the poly basic acid is used, then the first ionization constant (pKa1) is preferably at most 4.8 under the above conditions. Concretely there are inorganic acids (for example hydrochloric acid), carboxylic acids (for example acetic acid, lactic acid), polycarboxylic acids (for example citric acid, tartaric acid), derivatives of polycarboxylic acids, other organic acids (for example phenol), and the like. However, the acidic material is not restricted in them.

The explanation of the derivatives of polycarboxylic acids follow now. The standard structure of main chain of the derivative is alifatic hydrocarbon structure (such as saturated linear- and branched-chain hydrocarbon group, unsaturated linear- and branched-chain hydrocarbon group, monocyclic hydrocarbon group, aromatic hydrocarbon group, condensed ring hydrocarbon group, bridged ring hydrocarbon group, spiro hydrocarbon group, ring assemblies, terpene hydrocarbon group and the like), aromatic hydrocarbon structure (aromatic hydrocarbon group, condensed ring hydrocarbon group), heterocyclic hydrocarbon structure.

Further, the derivative of polycarboxylic acid includes at least one salt of carboxylic acid (—COOM; M is ionized to becomes positive ion). Further, in the derivative, other carboxyl groups are preferably transformed in ester group (—C(=O)O-Q; Q is for example alkyl group, aryl group and the like). Otherwise, it is preferable that the hydroxyl group on the carboxyl group is substituted to the amino group (—NH$_2$). As the polycarboxylic acid ester, there is ethyl ester of citric acid (the products of esterification between the citric acid and ethylalcohol). However, the derivatives of polycarboxylic acid are not restricted in the above description.

Note that it is preferable in the present invention that the acidic material is citric acid and the derivative thereof that has three carboxyl groups and is easily dissolved in water, and that the carboxyl group is transformed to other functional group so as to easily regulate the ionization constant. For example, as the derivatives, there is a citric acid-1-ethyl ester illustrated in CF1 (carboxyl group on a carbon atom C-1 is transformed in ester group). Instead thereof, there is citric acid-2-ethylester obtained in esterification of the carboxylic acid on a carbon atom C-2. Furthermore, ethyl citrate may be used, which is produced by esterifying citric acid and ethanol.

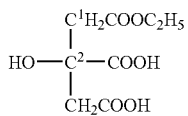

CF1

The acidic material of the present invention is not restricted in the above description. When the amount of the acidic material added into the dope is too large, the characteristics of the produced film changes, and it is not preferable. Further, when the amount is too small, the filtration in the method of the present invention would not be made smoothly. In the present invention, the citric acid or ethyl citrate is used as the acidic material, and when it is designated that TAC is used as the polymer, the citric acid and the derivatives thereof is added as the acidic material to the solvent such that the ion equivalent of the acidic material (citric acid or the derivatives thereof) may be the same as that of $Ca^{2+}$ and $Mg^{2+}$ in the dope. For example, it is preferable to perform the filtration in method (1) and (3) when the ratio of adding the citric acid or ethylester of the citric acid to the TAC is from 300 ppm to 600 ppm in weight. However, the ratio of adding the acidic material is not restricted in the above description.

As shown in FIG. 1A, cellulose fiber is used as the filter medium, and has hydroxyl groups (—OH) and carboxyl groups (—COOH) on the pore wall 10 of the pore 11. Acidic material (H-BA; BA$^-$ is a conjugate base) 21 is added into the dope 12, and dissociates to hydrogen ion (H$^+$) 21$a$ and anion (BA$^-$) 21$b$. In this case, as there are hydrogen ion (H$^+$) 21$a$ in the dope 12, the ionization of the carboxylic acid 18 is reduced. Further, an undissolved substance 15 (depicted as a molecule for easiness in this figure) ionizes to calcium carbonate cation (R—COOCa$^+$) 15$a$ and anion (X$^-$) 15$b$.

On a pore wall 10$a$ of a pore 11 there are almost not anions, for example carboxylate anion. Accordingly, calcium carbonate cation (R—COOCa$^+$) 15$a$ emits calcium ion (Ca$^{2+}$) 15$d$ in FIG. 1C, and the carboxylate ion (R—COO$^-$) combines with hydrogen ion (H$^+$) 21$a$ to generate carboxylic acid (R—COOH) 15$c$.

In the method for filtrating the dope in the present invention, the ionic bond which causes the remaining of the calcium carbonate cation (R—COOCa$^+$) on the pore wall in the prior art becomes impossible (see, FIGS. 14A-14C). Therefore the undissolved substance 15 is hardly adhered to the filter medium 10. Further, there are first type hydrogen bond 19$a$ between the oxygen atom of C=O in carboxylic acid 15$c$ and the hydrogen atom of the hydroxyl groups, and second type hydrogen bond 19$b$ between oxygen of C=O in carboxylic acid 15$c$ and the hydrogen of the carboxylic acid 18. Accordingly, the agglomerate or association of the carboxylic acid 18 sometimes adheres to the pore wall 10$a$ of the filter medium 10. However, as the molecular weight of carboxylic acid is small, the adhesion of the carboxylic acid would not cause the stop of the pore and therefore not increase the pressure for filtration.

Note that the calcium ion 15$d$, the hydrogen ion 21$a$ and the anion 21$b$ sometimes combine to form salt or remain in the situation of ion in the dope 12. In any case, the presence thereof does not have an influence to change the properties of the produced film.

(2) Performing Substitution of Hydroxyl Group of Filter Medium into Functional Group In FIGS. 2A-2C, the cellulose fiber used in a filter medium 30 has the cellobiose groups. As shown in CF2, the cellobiose group has six hydroxyl groups (—OH$^2$, —OH$^3$, —CH$_2$OH$^6$, —OH$^{2'}$, —OH$^{3'}$, —CH$_2$OH$^{6'}$). In FIG. 2A, many hydroxyl groups are substituted in other functional groups (—OR') 32.

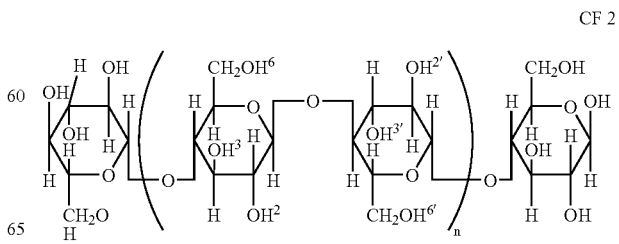

CF 2

As the alkyl group (—R') on the functional group 32, there are saturated hydrocarbon group (for example methyl group (—CH$_3$), ethyl group (—CH$_2$CH$_3$), tert-butyl group (—C(CH$_3$)$_3$) and the like), acylate group which are derivatives of the saturated hydrocarbon group (for example acetyl group (—CO—CH$_3$), propyonil group (—CO—CH$_2$—CH$_3$), iso butylyl group (—CO—CH(CH$_3$)$_2$), valeryl group (—CO—(CH$_2$)$_3$—CH$_3$), and the like), unsaturated hydrocarbon group (for example vinyl group (—CH═CH$_2$), iso propenyl group (—C(CH$_2$)═CH$_2$), derivatives of the unsaturated hydrocarbon group and the like, and aromatic hydrocarbon group (for example phenyl group (—C$_6$H$_5$), and the like), derivatives of the aromatic hydrocarbon group, and the like. These alkyl groups (—R') have hydrophobic property. Note that valeryl group is the especially preferable alkyl group (R') in the present invention. However, the sort of the alkyl group (R') is not restricted in the above description. Furthermore, the hydrogen atom on the hydroxyl group may be substituted to the group in which plural atoms are combined or associated.

Preferably, the esterification between cellulose and valeric acid (CH$_3$—(CH$_2$)$_3$—COOH) is made such that 70% of hydroxyl groups 17 may substituted to the functional groups 32 having valeryl group (—CO—(CH$_2$)$_3$—CH$_3$) as the alkyl group (—R').

On a pore wall 30a, as shown in FIG. 2A, some of the carboxyl group 18 in the dope 12 is dissociated into hydrogen ion (H$^+$) 18a and carboxylate anion (—COO$^-$) 18b. In FIG. 2B, the hydrogen bond between the hydroxyl group 17 and the oxygen atom of the C═O bond in the calcium carboxylate 15a is hardly formed. Accordingly, the calcium carboxylate 15 cannot adhered to the pore wall 30a.

As shown in FIG. 2C, an ionic bond 16a is formed between some of the calcium carboxylate cation 15a and the carboxilate anion 18b. Thus calcium dicarboxylate 15e is produced on the pore wall 30a. However, the number of the ionic bond 16b is not large. Accordingly, the pore 31 is not stopped and the filtration pressure is not increased in this situation.

In the calcium dicarboxylate 15e, the oxygen atom forming C═O bond on the pore wall 30a are combined through second type hydrogen bond 19b with the hydroxide group in the carboxyl group 18. However, the first type of hydrogen bond is hardly formed between the hydroxyl group 17 and the oxygen of C═O bond. Accordingly, the agglomerate and association of calcium carboxilate positive ion 15a that has large size would not be adhered to the filter medium 30.

(3) Performing Processes of Combination of (1) and (2)

The combination of the above embodiments (corresponding to FIGS. 1A-1C and 2A-2C) are the particularly preferable embodiment of the present invention. In FIG. 3A-3C, as hydrogen atom on hydroxyl group (—COOH) is substituted to the alkyl group (R') in the functional group 32, the pore wall 30a has hydrophobic property. In order to obtain this property adequately, the contact angle to water is at least 40°. The explanation of this embodiment is made by using FIGS. 4A-4C. Note that the embodiment of the present invention is not restricted in these figures.

In FIG. 3A, the hydrogen ion 21a in the dope 12 reduces that the hydrogen atom on the carboxylic acid 18 dissociates to become a hydrogen ion. The undissolved substance 15 ionizes in the dope 12 to calcium carboxylate cation 15a (R—COOCa$^+$) 15a and the calcium ion (H$^+$) 21a.

On the pore wall 30a, there are only a quite small number of anions. Accordingly, in FIG. 3C, calcium carbonate ion (R—COOCa$^+$) 15a emits calcium ion (Ca$^{2+}$) 15d which is the most stable in the dope 12. The carboxylic ion (R—COO$^-$) combines with hydrogen ion (H$^+$) 21a to become carboxylic acid (R—COOH) 15c.

Thus the ionic bond between the calcium carbonate cation and the carboxylate anion cannot be formed. Therefore the undissolved substance 15 hardly adheres to the filter medium 10. Further, second type hydrogen bond 19b is formed between oxygen of C═O in carboxylic acid 15c and the hydrogen of the carboxylic acid 18. However, the first type of the hydrogen bond is formed between oxygen of C═O in carboxylic acid 15c and the hydrogen of the hydroxyl group, as the hydroxide group 17 is substituted to the functional group 32. The inventor considers that the ionic bond and the first type of the hydrogen bond are a cause of the adhesion of the undissolved substance 15 to the pore wall of the filter medium. Accordingly, the adhesion of the undissolved substance 15 to the filter medium 30 is effectively reduced. Note that the calcium ion (Ca$^{2+}$) 15d and the hydrogen ion (H$^+$) 21a and the anion (BA$^-$) sometimes combine to form a salt, and otherwise they exist as ion. In any case, even the salt and the ion exist in the dope, the properties of the formed film are not influenced.

Figures 4A, 4B, 4C:
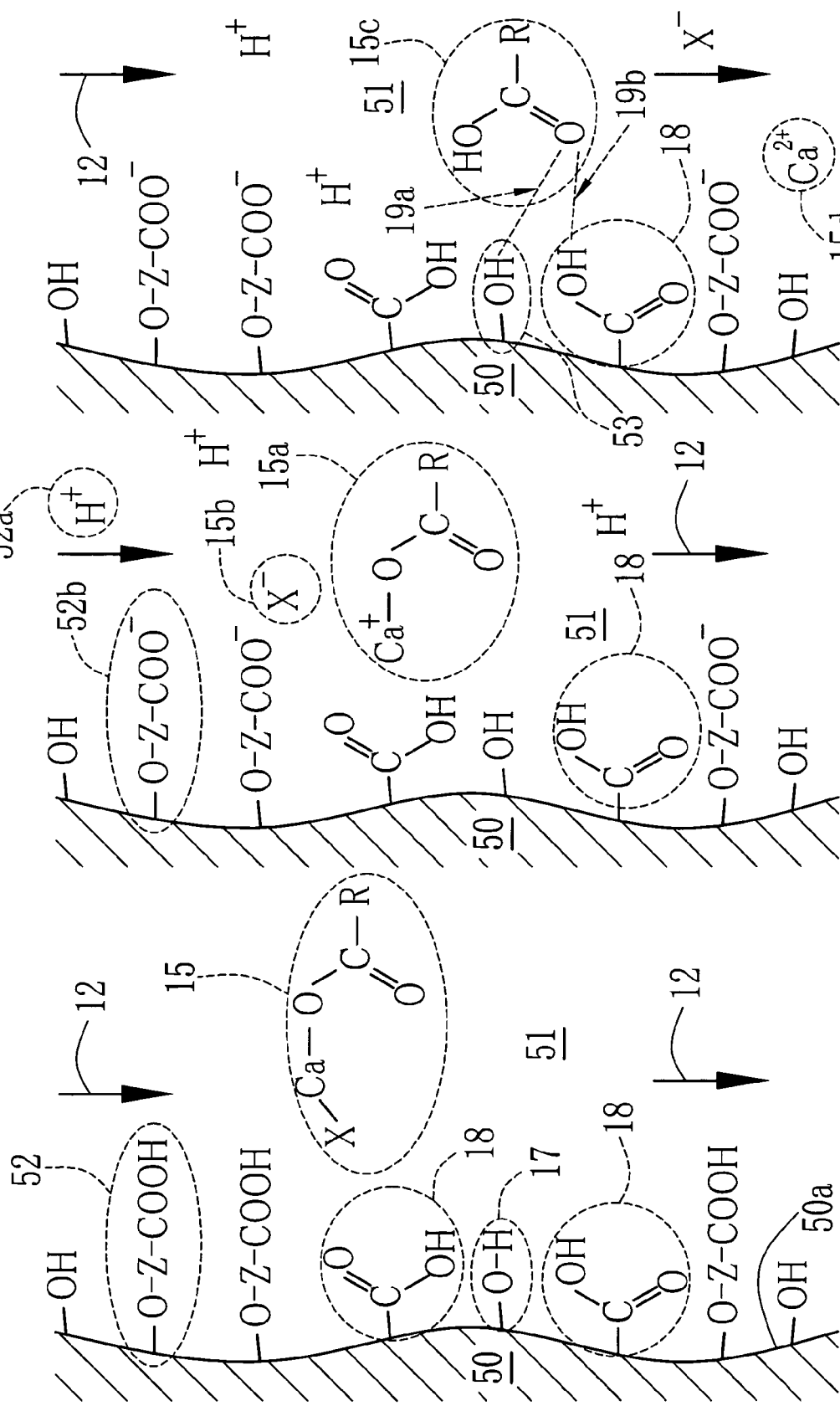
FIG. 4A is an exploded sectional view illustrating models of the first embodiment of a method for filtrating a polymer solution according to the present invention.
FIG. 4B is the same view as FIG. 4A.
FIG. 4C is the same view as FIG. 4A.

(4) Performing Substitution Hydrogen Atom on Hydroxyl Group of Pore into Functional Group with Character of Acid As shown in FIG. 4A, hydrogen atoms of some hydroxyl groups which aren't on the carboxyl groups are substituted to an atomic group. As the atomic group, there is a substituent (-Z-COOH) 52 which have a carboxylate group (—COOH). The atomic group Z is alkyl chain (for example —CH$_2$—, —CH$_2$—CH$_2$—, —CH═CH—, and the like, which are represented R1), derivatives of the alkyl group (—CO—R1), and aryl group and the like. Instead of the group 52 may be substituted the hydrogen atom of the hydroxyl group to the following groups: metal carboxylate group (-Z-COO-M$^I$, (-Z-COO)$_2$-M$^{II}$; M$^I$ is alkali metal and the like, and M$^{II}$ is magnesium and alkali earth metal), sulfonic acid group (-Z-SO$_3$H), salt form of sulfonic acid (-Z-SO$_3$M$^I$). Preferably, the functional group 52 is 3-carboxypropanyl group (—CO—(CH$_2$)$_2$—COOH) in which the group Z is (—CO—(CH$_2$)$_2$). In the present invention, the addition of the acid material causes the electric repulsion between the acid on the filter and the acid of the undissolved substances. Accordingly, the adhesion of the undissolved substances to the pore wall is reduced.

In this embodiment, the hydrogen atom on the hydroxide group is replaced with the 3-carboxypropanyl group (—CO—(CH$_2$)$_2$—COOH) in reaction of succinic acid (HCOO—(CH$_2$)$_2$—COOH) and cellulose of a filter medium 50. Thus 50% of the hydrogen atoms of the hydroxyl group are substituted. Note that the method for substitution is not limited to the above description in the present invention.

As shown in FIG. 4B, the functional group 52 dissociates to the hydrogen ion 52a and the carboxylate anion 52b. As the undissolved substances 15 are contained in the dope 12, the undissolved substance 15 in the dope 12 ionizes to calcium carboxylate cation 15a (R—COOCa$^+$) 15a and the calcium ion (H$^+$) 21a. Further, as the hydrogen ion 52a is emitted from the functional group 52, the carboxylate groups 18 almost don't emit the hydrogen ion.

The hydrogen ion 52a reduces to dissolve the carboxylic acid 18. Accordingly, the calcium carboxylate cation 15a in the dope 12 hardly form an ionic bond.

In the dope 12 there are large number of hydrogen ion 52a. Accordingly, calcium carbonate cation (R—COOCa$^+$) 15a emits calcium ion (Ca$^{2+}$) 15d in FIG. 4C, and the carboxylate anion (R—COO$^-$) 15 combines with hydrogen ion (H$^+$) 52a to produce carboxylic acid (R—COOH) 15c.

In this embodiment, the ionic bond between the calcium carbonate cation and the carboxylate anion cannot be formed. Therefore the undissolved substance 15 is hardly adhered to the filter medium 10. Further, there are first type hydrogen bond 19a between oxygen of C=O in carboxylic acid 15c and the hydrogen of the hydroxyl group, and second type hydrogen bond 19b between oxygen of C=O in carboxylic acid 15c and the hydrogen of the carboxylic acid 18. However, the number of the hydroxyl group is very small, the carboxylic acid hardly adheres to the filter medium 50. Furthermore, although the carboxylic acid 15c adhered to the pore wall 50a, the molecular weight of the carboxylic acid 15c is very small. Therefore, the adhesion of the carboxylic acid does not cause the stop of a pore 51 and therefore not increase the pressure for filtration.

According to this embodiment, the adhesion of the undissolved substances to the pore wall is reduced without adding the acidic material in the dope 12. As in the dope there is no conjugated base (such as $BA^-$ in FIG. 1A) which would be generated by adding the acidic material, the elements which would cause to change the optical property of the produced film are reduced.

The explanations for the methods for filtrating the dope of the present invention are not restricted in the consideration of the inventors as above descriptions with the illustrations of FIGS. 1A-4C.

Note that the present invention is not restricted in the methods (1)-(4). For example, in the method (4), the acidic material may be added to the dope 12. Further, it is preferable to feed the dope at a constant flow rate. The flow rate is preferably in the range of 50 L/(m$^2$·hr) to 250 L/(m$^2$·hr), but not restricted in the range. Further, it is preferable in the present invention that while the dope is filtrated, the temperature of the dope is in the range of 20° C. to 50° C. such that the dope is filtrated in the manner of the method of filtrating the dope. However, the present invention is not restricted in the range. The range of the temperature is determined depending on the solvent, the undissolved substance to be removed, and the undissolved substance not to be removed.

Note that, according to the filter mediums in FIGS. 1A-4C and, 14A-14C, as the material of the cellulose fiber is natural materials of pulp, linter and the like, some of the six hydroxyl group in the cellobiose group (unit constructing cellulose) is substituted to the functional group having the carboxyl group and the like.

[Method of Producing Polymer Solution]

Figure 5:
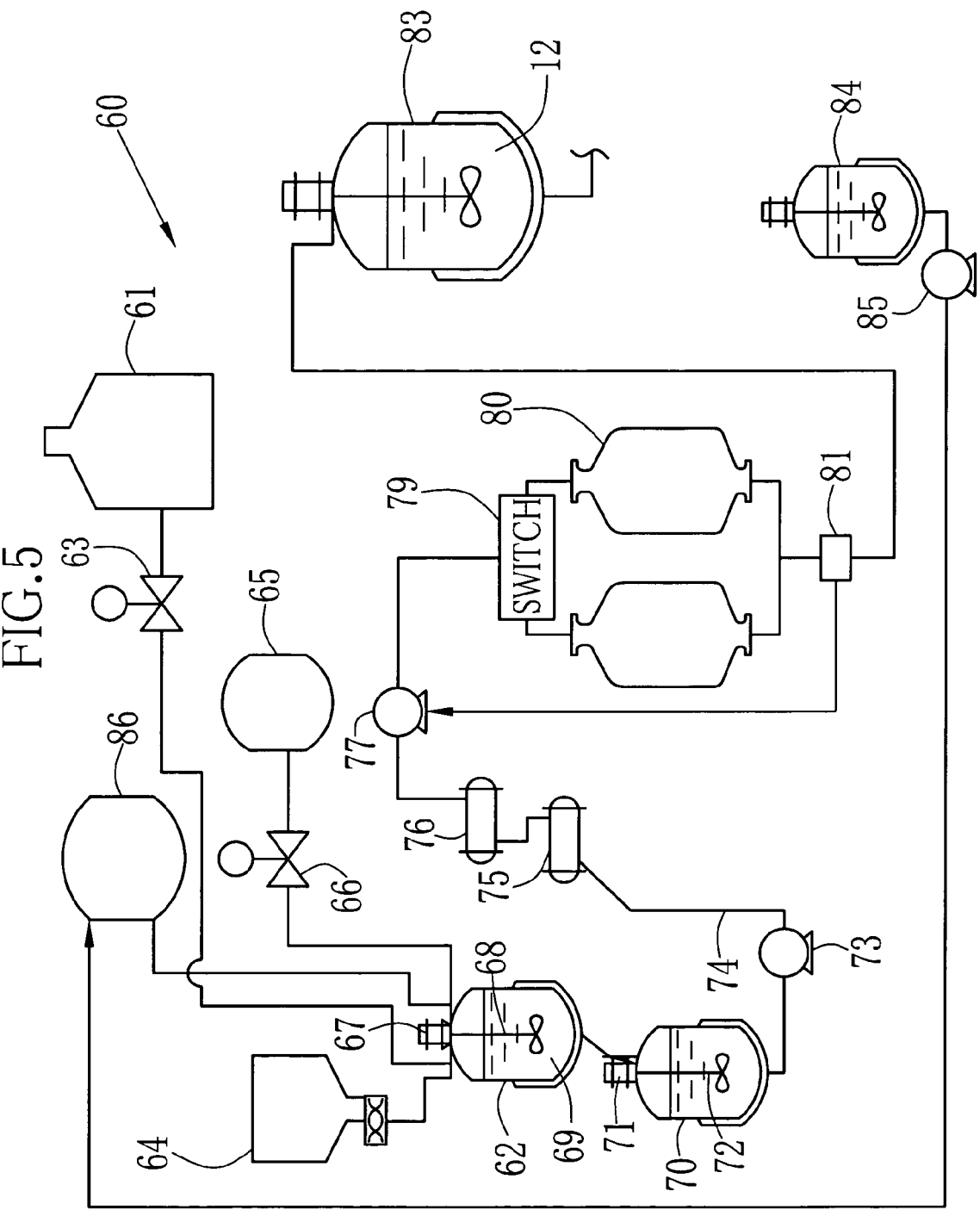
FIG. 5 is a schematic diagram of a dope production line having a filtrating device to which the method of the present invention is applied.

In a dope production line 60 in FIG. 5, there are two filtrating devices 80 in which the filter medium 30 formed of the cellulose is used. In the film producing line 60, the acidic material is added to the dope (see FIGS. 4A-4C), and the cellulose fiber is used for the filter medium of the filtrating device. In the cellulose fiber, the hydrogen atom on the hydroxyl group is substituted.

In order to produce the dope 12, at first the acidic material is added to the solvent and stirred in a process for preparing an acidic solvent (not shown) uniformly. Thereafter, the solvent is supplied in a solvent tank 61. Preferably, the content of the acidic material is previously calculated so as to be in the range of 50 ppm to 2000 ppm in weight to the polymer to be added to the solvent thereafter. However, the present invention is not restricted in this range. Further, the term "solvent" may be used as the mixture solvents of several sorts of organic liquids, when the mixture solvent is used.

The predetermined amount of the acidic solvent is fed from the solvent tank 61 to a dissolution tank 62. Thereby the feed amount of the acidic solvent is regulated by opening and closing a valve 63.

A hopper 64 contains the polymer. The polymer is fed to the dissolution tank 62 and thereby the amount of the polymer is measured. The amount of the polymer is preferably in the range of 12 wt. % to 28 wt. %, particularly 15 wt. % to 25 wt. % especially 17 wt. % to 23 wt. %, in order to obtain the dope which can form the film having high quality. However, the present invention is not restricted in the range. In this embodiment, TAC is used as the polymer.

A plasticizer is contained in a plasticizer tank 65, and fed to the dissolution tank 62. Thereby predetermined amount of the plasticizer can be fed by opening and closing a valve 66 disposed between the plasticizer tank 65 and the dissolution tank 62. Note that TPP and BDP are used as the plastisiser. However, the present invention is not restricted in them.

The lubricant is fed to the dissolution tank 62 as a solution in which the lubricant is dissolved to the solvent. However, the state of the plasticizer is not restricted in this embodiment. When the plasticizer is in a liquid state in a room temperature, then the plasticizer is fed into the dissolution tank 62 without preparing the plasticizer solution. When the plasticizer is in a solid state in a room temperature, then the plasticizer is fed into the dissolution tank 62 by using the hopper. It is preferable in this embodiment that the content of the plasticizer in the dope 12 is in the range of 5 wt. % to 20 wt. % of the polymer. In this case, the film has suitable plasticity, and the quality of the film becomes high. However, the present invention is not restricted in the range.

In the above explanation, the solvent, the polymer and the plasticizer are supplied into the dissolution tank 62 in this order. However the order is not restricted in this description. For example, after the predetermined amount of the polymer is fed in the dissolution tank 62, the feeding of the predetermined amount of the acidic solvent may be performed. Further, the plasticizer may be previously added to the mixture of the polymer and the solvent not in the dissolution tank 62 but anywhere (or in any process) before filtrating the dope 12. Further, other additives than the plasticizer may be added, for example UV-ray absorbing agent).

The dissolution tank 62 has a stirrer 68 rotated by a motor 67. When the stirrer 68 is rotated, a crude solution 69 of the solvent, polymer, plasticizer and the like is stirred such that the solid such as the polymer may be dissolved more over. The crude solution is determined as the solution in which the solids remain. It is preferable to stir the crude solution 69 for from 30 to 90 minutes. However the present invention is not restricted in the range.

In view of the cost, it is preferable to produce the dope 12 in a continuous batch method. In the batch method, all of the crude solution 69 is fed to a storage tank 70 such that the dissolution tank 62 becomes empty. The storage tank 70 has a stirrer 72 rotated by a motor 71. The stirrer 72 rotates to keep a concentration of the crude solution 69 constant. Thereafter, the mixture is fed through a pipe 74 toward a heating device 75 by the drive of a pump 73. However these processes are not restricted in this figure.

While the crude solution 69 is fed toward the heating device 75, the pipe 74 is preferably heated such that the dissolution of the solid may be accelerated. Therefore the time necessary for preparing the dope 12 becomes shorter.

The heating device 75 is heated to prepare the dope in which the predetermined amount of the solutes (polymer and the like) is dissolved to the solvents moreover. The crude solution stays in the heating device 75 for 5-30 minutes while the heating temperature of an inner wall of the heating device 75 that contact to the crude solution is preferably in the range of 60-150° C., particularly 60-120° C. However, the present invention is not restricted in it. Thus the dope 12 is obtained. When the crude solution is heated for less than five minutes, then the dissolution of the solids is not enough. When the crude solution is heated for more than thirty minutes, the heating is too much and the quality of the produced dope often changes. Further, when the heating temperature is less than 60° C., the dissolution of the solid is not enough. When the heating temperature of the inner wall is more than the maximal temperature $T_{max}$ of 150° C., the denaturation of the solutes often occures.

As the preferable heating device for preparing the dope effectively, there are inline mixers, such as a multi tube heat exchanger (shell & tube type) and a static mixer having multi tube (at least double tube). In view of the effects of heat exchange, the spiral heat exchanger is especially preferable. The spiral heat exchanger has a structure that two plates are rolled at a center of the heat exchanger to have a spiral shape and to form two passages. This structure is excellent in the effective heat transfer, as the heat transfer size becomes wider to section of the passage of the processing liquid. The preferable material of the heating device 75 has corrosion resistance. Concretely, the material is stainless, titanium, hastelloy (name of product), and the like. Thus the dope can be more smoothly produced without change of the size of the dissolution tank 62 such that the producing can be made in high speed for mass production.

Inner surfaces of the pipe 74 and the passage for the dope in the heating device 75 are formed of stainless. Stainless is a magnum of iron and chrome and excellent in the corrosion resistance. However, when the main solvent of the dope is hydrocarbon halide such as dichloromethane, then the solvent decomposes to generate the chloride ion or hydrochloric acid, which would corrode stainless. Especially when the temperature of stainless becomes higher, the speed of the corrosion becomes higher. In the corrosion, the dope contains iron, chrome and the like as impurity. Accordingly, the temperature of the inner surface of the pipe 74 and the heating device 75 is regulated not so as to be larger than the maximum temperature $T_{max}$. In order to reduce the corrosion, it is preferable that the maximum temperature $T_{max}$ of the inner surface is lower. However, when it is too low, the solids (especially polymer) hardly dissolve to the solvent. Accordingly, that the maximum temperature $T_{max}$ is preferably at most 150° C., particularly 110° C., and especially at most 100° C. in the present invention. Note that the minimum temperature of the inner surfaces is not determined especially, and may be the lowest temperature for maintaining the dissolubility of the solvent. The minimum temperature is, for example preferably at least 35° C., particularly 60° C., especially 70° C., when dichloromethane is used as the main solvent for preparing the dope.

Then the dope 12 is fed to a cooling device 76 to cool under the boiling point of the main solvent of the dope 12 such that the produced film may have the high quality. Note that the heating device 75 is not necessary for preparing the dope 12. For example, the dope 12 can be obtained in the pipe 74 for feeding the crude solution 69, when the pipe is heated, or when the stirrer 72 in the storage tank 70 is rotated at high velocity. Note that the method of obtaining the dope is not restricted in the heating method with the heating device 75.

Thereafter, the dope 12 is fed through a switch 79 to the filtrating device 80 by drive of a pump 77. In this figure, the number of the filtrating devices 80 is two. However, the number is not restricted in it, and may be one (in this case the path changer is not used) or more than three. The sorts of the filtrating device are optional.

After the filtration of the dope 12 is made in the filtrating device 80, the dope 12 is fed out through a flow meter 81 to a dope tank 83. Preferably, the feed amount of the dope 12 is constant. Accordingly, a flow meter 81 is measures the flow rate of the dope 12 to send a data thereof to a controller (not shown), and the controller controls a pump 77 to keep the flow rate constant in the quantitative filtration method. Note that the low rate is preferably in the range of 50 L/(m²·hr) to 250 L/(m²·hr). However, the flow rate is not restricted in the range. Note that the filtration pressure may be kept constant. Namely, the method of producing the dope in the present invention is applied to other known methods of filtrating the dope. Further, the flow rate may not be constant when the filtration is made.

It is necessary to cleanse the filtrating device 80 with use of the solvent in a solvent regulator 84. A cleansing waste liquid is fed to a recycle solvent tank 86 by a pump 85. Then the recycled solvent is fed to a dissolution tank 62 and used as the solvent for preparing the dope 12, so as to keep the low cost. Preferably, after the filtrating device 80 is cleansed with the solvent, the dope 12 is previously fed into the filtrating device 80 before use thereof again. Otherwise, the solvent remaining in the filtrating device 80 reduces to keep the concentration of the dope in the dope tank 83 constant.

In the above embodiment, the acidic material is supplied in the solvent in the solvent tank 61. However, the timing of adding the acidic material is not restricted in it. The acidic material may be added anywhere upstream from the filtrating device 80. Further, after the acidic material is added, the concentration thereof often hardly becomes uniform. In this case, a static mixer is disposed downstream from a position where the acidic material is added.

Figure 6:
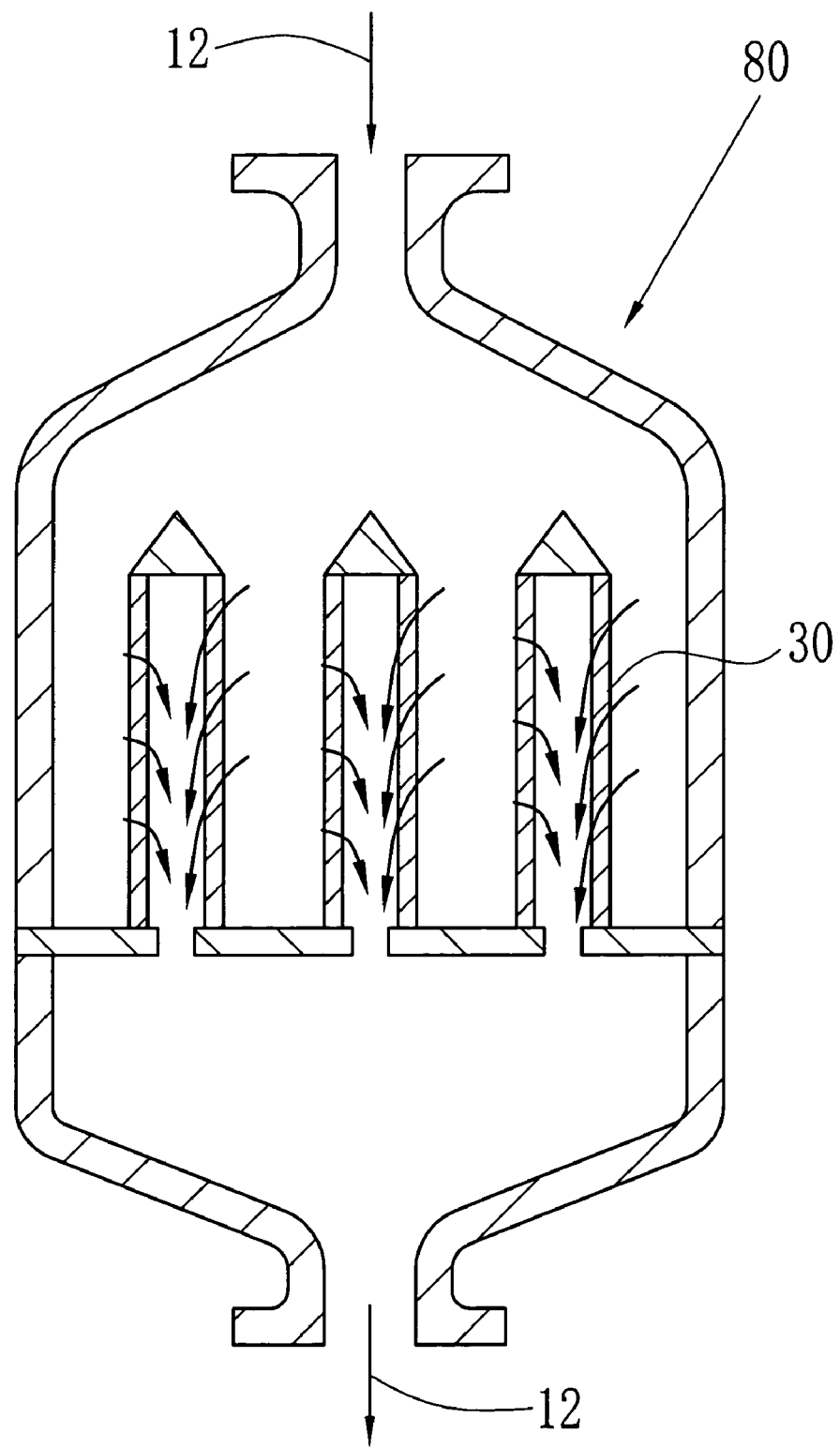
FIG. 6 is a sectional view of a filtrating device in FIG. 5.

In FIG. 6, the filter medium 30 is used in the filtrating device 80. As the undissolved substance under the standard size passes through the porous of the filter medium and fed out from the filtrating device 80, the life of the filter medium becomes 1.2-2.0 times longer. When passages to the filtrating devices is changes by the operation of a switch 79, then composition in the dope often fluctuates. In the present invention, such variation occurs less than in the prior art, such that the continuous drive of the dope production line 60 becomes possible.

The method for filtrating the dope that corresponds to FIG. 3 is applied to the filtrating device 80 in the above dope production line 60. However, the other methods for filtrating that correspond to FIGS. 1A-2C, 4A-4C may be applied. When the methods for filtrating that correspond to FIGS. 2A-2C and 4A-4C are applied, then the adding of the acidic material to the solvent in the dissolution tank 61 is not necessary. Note that the acidic material may be added to the solvent in the method for filtrating that correspond to FIGS. 4A-4C.

[Solution Casting Method for Producing Film]

Figure 7:
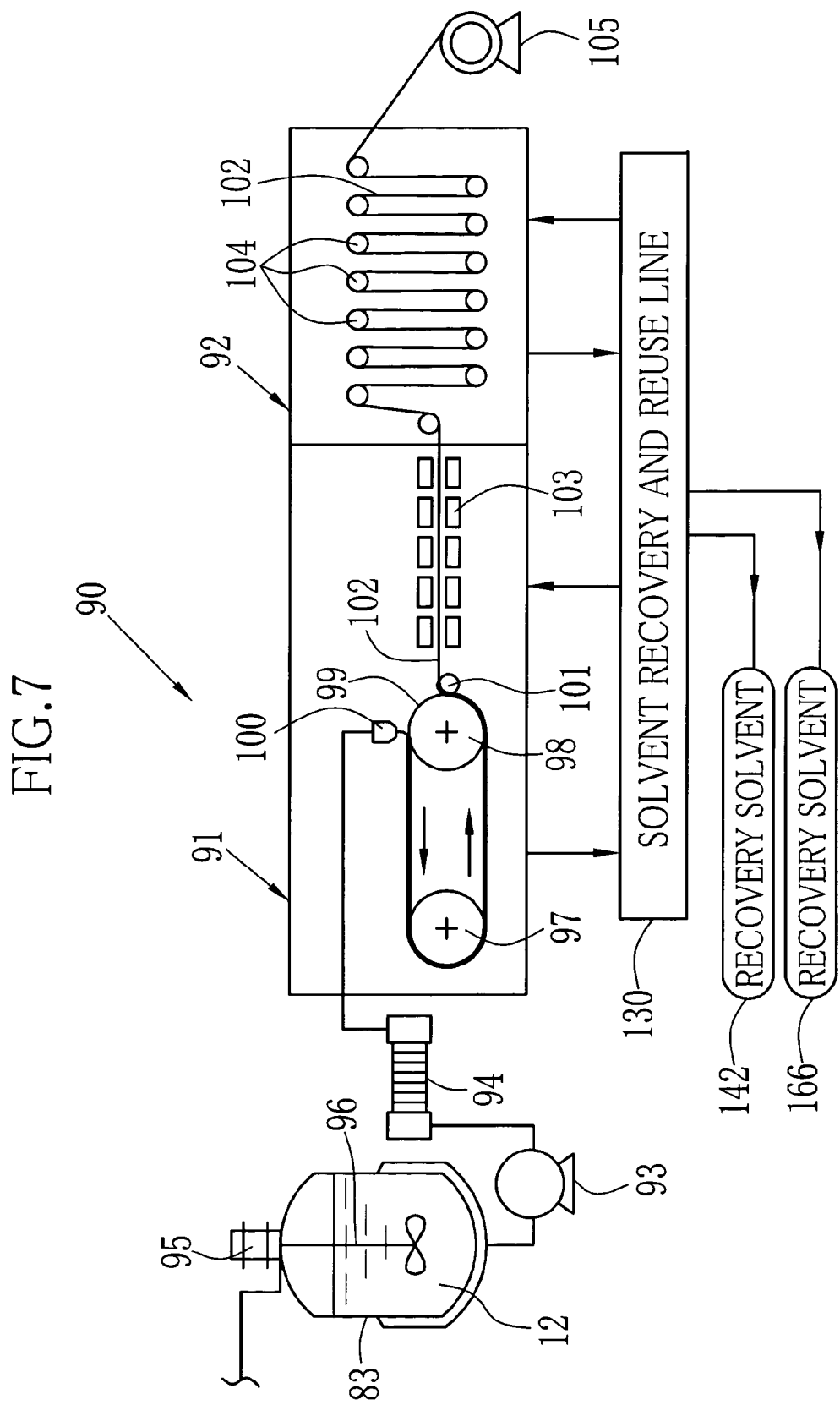
FIG. 7 is a schematic diagram of first embodiment of a film production line.

As shown in FIG. 7, a film producing apparatus 90 is constructed of a film forming zone 91 and a film drying zone 92. However, the film producing apparatus 90 used in the present invention is not restricted in it. The dope tank 83 (FIG. 5) is connected through a pump 93 and a filtrating device 94 to the film producing apparatus 90. The dope tank 83 is provided with a stirrer 96 which is rotated with a motor 95 so as to make the dope 12 uniformly. Further, a solvent recovery and reuse line 130 is attached to the film producing apparatus 90. In the solvent recovery and reuse line 130, an solvent vapor evaporated from the dope 12 and the film 102 in the film forming zone 91 and the film 102 in the film drying zone 92 is recovered as recovery solvents 142, 166, which are reused for preparing the dope 12.

The dope 12 often contains liver or black impurities. In order to remove them from the dope 12, the filtration of the dope 12 is made with a filtrating device 94. The impurities usually contain iron, chrome, and chlorine, and when remaining in the film 102, they are considered as one of causes of the generation of brown foreign materials which have bad influence on the optical properties of the film 102. A filter medium of the filtrating device 94 has pores, and the diameter (nominal pore diameter) of each pore is preferably from 1 µm to 50 µm, particularly from 5 µm to 40 µm. When the diameter of the pore is less than 1 µm, the pressure for filtration becomes high. However, the number of the foreign materials in the produced film is not effectively reduced. Furthermore, although the exchange of the filter medium is made more often, the properties of the film is not improved so much. Accordingly, the productivity becomes lower. When the diameter of the pore is more than 50 µm, the impurities having a large size enough that the large foreign materials damages the produced film remains in the dope 12.

As the filter medium in the filtering device 94, it is preferable to use a filter of depth type (hereinafter depth filter). The depth filter is called a filter of volume type or granular type. The depth filter has multi-layer structure, and each layer has pores, and the diameter of each pore is several times as large as nominal pore diameter (for example, when the nominal pore diameter is 10 µm, then the diameter of the pore is 20-30 µm). Further, plural layers of the depth filter are overlaid such that the micro hole of the nominal pore diameter is formed randomly in the overlaying direction. Accordingly, when the impurities are captured in some of the pores and the pore is stopped, then the dope passes through the other pores, and the life of the filter medium is long. Note that as the depth filter there is wind cartridge filter TCW type (produced by Toyo Roshi Kaisha Ltd.), depth cartridge filter TCPD type, fine pore NF series (produced by Nippon Seisen Co., Ltd.) and the like. However, the kind of the depth filter is not restricted in them.

Note that the effect of the present invention becomes larger when the plural filter mediums are used. In this case, each filter medium has different nominal pore diameter. The filter medium in the upstream side has the large nominal pore diameter, and that in the downstream side has the small nominal pore diameter. Thereby the parts or all of the filter mediums may be the depth filters. Note that the nominal pore diameter is not especially limited in the present invention. However the absolute filtration accuracy is preferable at most 6 µm. Note that the lower limit of the absolute filtration accuracy is preferably small in the view of removing the impurities from the dope. However, when the dope 12 passes through the filter mediums of the small absolute filtration accuracy, then the life of the filter becomes extremely shorter, and the effect for making the optical property of the formed film better becomes much less. Accordingly, it is preferable that the absolute filtration accuracy is optionally selected to at least 3 µm, at least 1 µm or the like in view of the improvement of the optical properties (optical anisotropy, optical isotropy and the like) of the film and the cost for production.

Further, the raw material of the filter medium is not especially restricted. For example, there are a synthesized fiber (such as polypropylene, tefron (trade name),) a metal fiber (stainless), and preferably polypropylene fiber. The filter medium may be the filter paper.

The diameter of retentive particles of the filter paper used as the filter medium is preferably at most 8 µm, particularly at most 7 µm, and especially at most 6 µm. (The diameter of retentive particle is determined on the basis of JIS P3801 The diameter of retentive particles is determines as the diameter of the particles, 70% of which the filter paper traps when the filtration of a solution containing dusts of uniform particle size is filtrated under the same conditions. The raw material of the filter paper is preferably natural fibers whose main material is cotton linter and wood pulp. The filtration time is preferably at least 20 seconds, particularly at least 40 seconds. The thickness of the filter paper is preferably at least 0.75 mm, and particularly at least 1.0 mm. Further, the filtration pressure is at most 16 kgf/cm$^2$ ($\approx$1.6 Mpa), particularly 12 kgf/cm$^2$ ($\approx$1.2 Mpa), especially 10 kgf/cm$^2$ ($\approx$1.0 Mpa), and most especially 2 kgf/cm$^2$ ($\approx$0.2 Mpa).

In the present invention, the diameter of retentive particles is measured on the basis of JIS Z 8901. The filtration time is measured on the basis of JIS P 3801 7.5. The thickness of the filter medium is measured on the basis of JIS P 8118. Further, in order to measure the filtration pressure, a pressure meter is disposed in a upstream side from the filtering device.

In the film forming zone 91, there is a band 99 supported by supporting rollers 97, 98. The supporting rollers 97, 98 are rotated by drive of a motor (not shown) to continuously move the band 99. Above the roller 98, a casting die 100 is disposed so as to confront to the band 99. The dope 12 is fed from the dope tank 83 by the pump 93, and the impurities and the like are removed in the filtrating device 94. Thereafter, the produced dope is supplied in the casting die 100.

The casting die 100 casts the dope 12 on the band 99. The dope 12 is conveyed and gradually dried on the band 99 to form a film 102 having a self supporting property. Then the film 102 is peeled from the band 99 by a peel roller 101, and thereafter fed and dried in a tenter dryer 103. It is preferable that the tenter dryer 103 stretches the film 102 in a predetermined direction. The film 102 is fed thereafter from the tenter dryer 103 to the film drying zone 92. In the film drying zone 92 the film 102 is guided by plural rollers 104 and dried. Thereafter the film 102 is wound by a winder 105. In order to dry the film 102 uniformly, it is preferable that the temperature in the film drying zone 92 is regulated in the range of 50° C. to 150° C. However, the temperature is not restricted in the range.

Note that a cooling zone for cooling the film 102 may be provided between the film drying zone 92 and the winder 105. In this case, it is preferable that the temperature of the film 102 becomes the room temperature. However, the temperature is not restricted in it. Further, before winding, the knurling of the film 102 or the cutting of both side edges of the film 102 with an cutter (not shown) may be performed.

Figure 8:
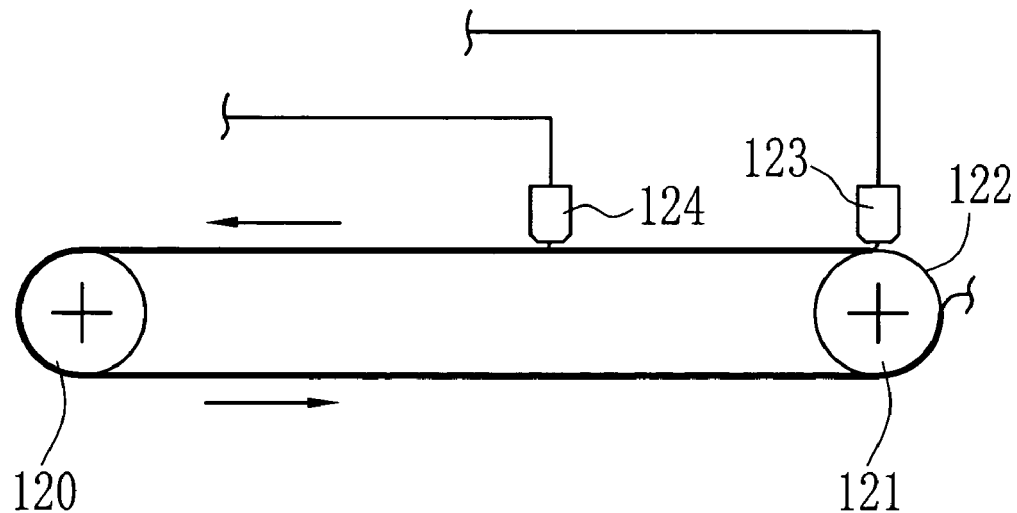
FIG. 8 is a schematic diagram of a second embodiment of the solution casting method.

In FIG. 8, supporting rollers 120, 121 support a belt 122. when the supporting roller 120 and 121 are driven by a driver (not shown) to rotate, the belt 122 is fed continuously. Above the belt 122, casting dies 123, 124 are disposed so as to sequentially cast a first dope for forming a front surface of a produced film and a second dope for forming a rear surface of the produced film. Thus the film is produced. Note that the present invention is not restricted in this figure in which two casting dies are used. The number of the casting dies may be the minimum of three.

Figure 9:
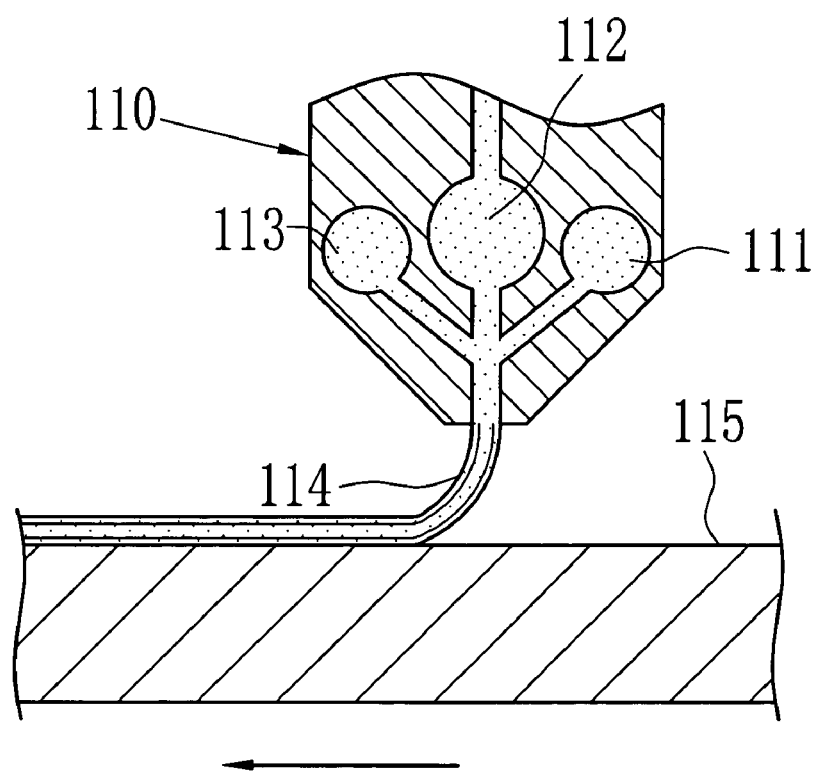
FIG. 9 is a sectional view of a casting die used in a third embodiment of the solution casting method.

Note that, as shown in FIG. 9, a multi-manifold type of a co-casting die 110 having plural manifolds 111-113 may be used for simultaneously casting plural dopes. The manifolds 111-113 are supplied with the plural dopes for forming front, intermittent and rear layers. These dopes are jointed in the co-casting die 110 and cast on the band 99. It is to be noted in this embodiment that the manifold 112 is supported with the dope 12 and the manifolds 111, 113 are supplied with the other dopes. Further, the number of the dopes for co-casting is not restricted in three. Further, in order to perform the co-casting of the dopes, the feed block type may be applied instead of the multi-manifold type as a casting die. Note that the co-casting die 110 may be used with other casting dies for sequentially casting the dopes.

[Process of Recovering and Reusing Solvent]

Figure 10:
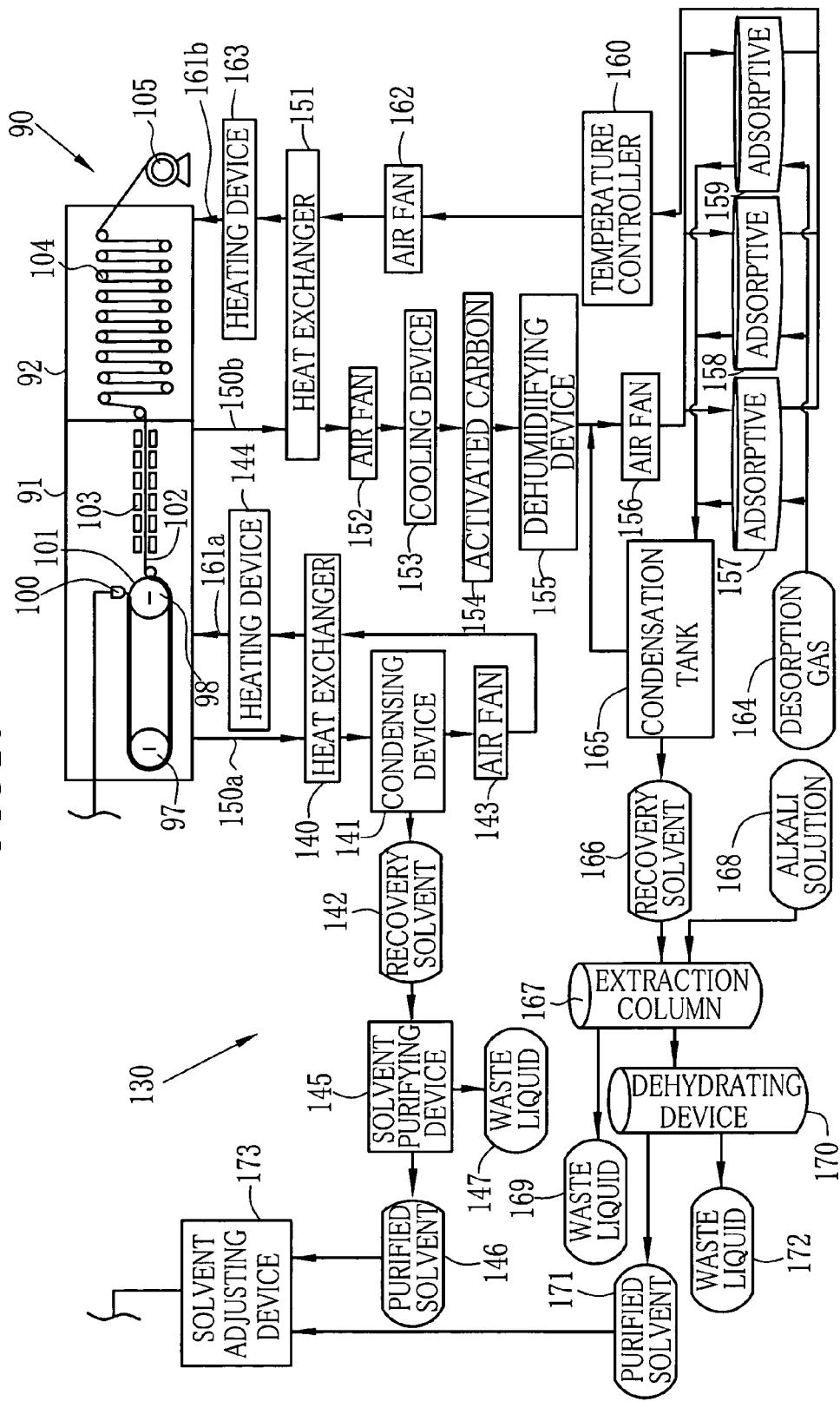
FIG. 10 is a diagrammatical view of a solvent recovery line to which a method of preparing a solvent of the present invention is applied.

In FIG. 10, the solvent recovery and reuse line 130 feeds out a drying air 161*a* into the film forming zone 91 such that the solvent vapor (not shown) is evaporated from the dope on a belt 99 and the film 102. An air 150*a* containing the solvent vapor is fed from the film forming zone 91 to an heat exchanger 140. In the film forming zone 91, a large amount of the solvent is evaporated from the film 102 to become a solvent vapor since the film 102 is in an initial situation of drying. The solvent vapor is condensed in a condensing device 141 to become the condensed solvent 142 in a liquid state. The remaining air 150*a* containing the solvent vapor which is not liquidized with the condensing device 141 is fed to the heat exchanger 140 by drive of an air fan 143. In the heat exchanger 140, the heat exchange is made such that the temperature of the air 150*a* becomes higher. Further, the air 150*a* is heated to the predetermined temperature with a heating device 144, and thereafter fed back to the film forming zone 91 and reused as the drying air 161*a*.

The recovery solvent 142 is fed to a processing device 145 and separated to a purified solvent 146 such that water may be not contained in the purified solvent 146. Thereafter, the wasting process of the waste liquid 147 is performed. The separation to the purified solvent 146 and the waste liquid 147 is made in a fractional distillation. Representative one of devices for fractional distillation is a continuous rectification device, but they are not restricted in it. Further, without the device for separation, silica gel can remove water from the recovery solvent 142 to obtain the purified solvent 146.

The solvent recovery and reuse line 130 feeds out a drying air 161*b* whose temperature is higher than the drying air 161*a* in the film forming zone 91. In the film drying zone 92, the solvent, the additives and the like are evaporated from the film 102, and an air 150*b* containing a vapor of the solvent, the additives and the like is fed to a heat exchanger 151 and thereafter to a cooling device 153 with a air fan 152. Gas of high molecular weight compounds in the cooled air 150 is adsorbed to an activated carbon 154. Then, a dehumidifying device 155 removes water from the air 150*b*. Thereafter, the air 150*b* is optionally fed to one of the adsorptives 157-159 by drive of the air fan 156 and operation of a switch (not shown), and the solvent vapor in the air 150*b* is adsorbed to the one of the adsorptives 157-159. Each adsorptive 157-159 contains an adsorptive agent, for example activated carbon. The temperature of the air 150*b* after the adsorption is adjusted to a predetermined one with a temperature controller 160. Thereafter, the air 150*b* is fed to the heat exchanger 151 by drive of an air fan 162. In the heat exchanger 151, the heat exchange is made with the air 150*b* fed out from the drying zone 92, such that the temperature of the air 150*b* to be fed back into the drying zone 92 becomes higher. Further, the air 150*b* is heated to the predetermined temperature with a heating device 163. Then the air 150*b* is fed back to the film drying zone 92 and used as the drying air 161*b*.

After adsorption of the solvent onto the adsorptives 157-159, the desorption gas 164 is fed through such that the vapor of the solvent vapor is desorbed from the adsorptive. Then, the desorption gas 164 containing the vapor components is fed to a condensation tank 165. In the condensation tank 165, the solvent vapor is condensed and recovered as the recovery solvent 166 in the liquid state. Further, other solvent components which is not condensed if fed back to the air fan 156 and to the adsorptives 157-159.

The recovery solvent 166 is fed to an extraction column 167 and forms an organic phase and an aqueous phase, separately. An alkali solution 168 is added to the recovery solvent 166, then the component of the solvent is transported to an organic phase. Further, as the solvent becomes alkaline, it is reduced to corrode the metals of the pipe and the devices, such as stainless and the like. As the alkali solution, there are aqueous solutions of sodium hydroxide (NaOH), sodium carbonate ($Na_2CO_3$), calcium hydroxide ($Ca(OH)_2$), calcium oxide and the like. The aqueous phase is withdrawn as the waste liquid 169, and abolished after the wasting treatment. The organic phase is fed to a dehydrating device 170, and the small amount of water is removed from the organic phase. Thus the purified solvent 171 is obtained, and the removed water is abolished as a waste liquid 172 after the wasting process. The purified solvents 146, 171 are fed to a solvent adjusting device 173 for adjusting the contents and the pH value of the purified solvents 146, 171.

Figure 11:
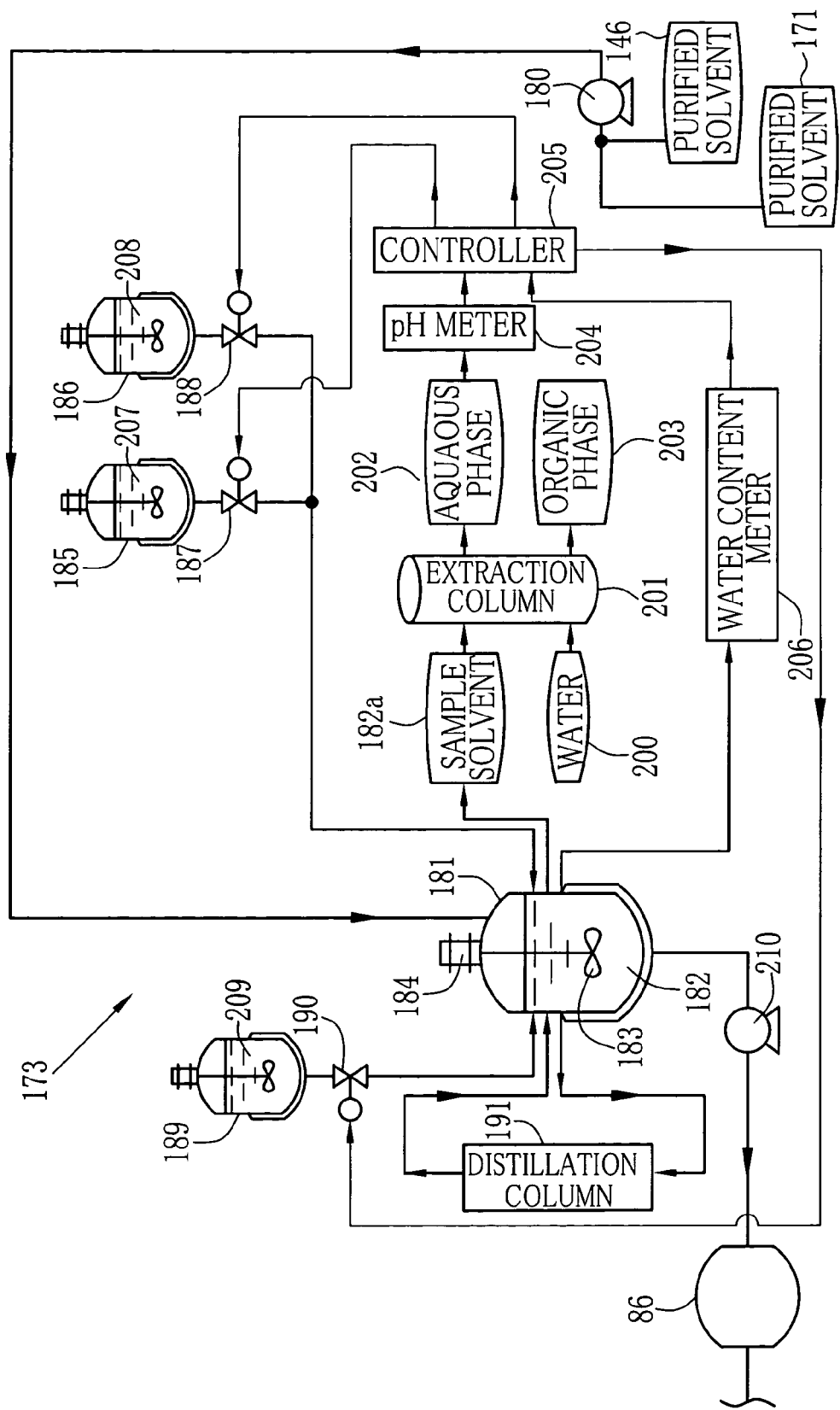
FIG. 11 is a diagrammatical view of an adjusting device in the solvent recovery line.

As shown in FIG. 11, a pump 180 is driven to feed the purified solvents 146, 171 in an adjustment tank 181. The adjustment tank 181 is provided with a stirrer 183 for stirring the solvent 182. The stirrer 183 is connected to a motor 184 and rotated in accordance with the drive of the motor 184 to stir and mix the solvent 182. The adjustment tank 181 is connected to an acidic solution tank 185 and an alkali solution tank 186 through valves 187, 188. Further, the adjustment tank 181 is connected to a water tank 189 through a valve 190. The adjustment tank 181 is provided with circulating a distillation column 191 for performing the dehydration of the solvent 182.

The part of the solvent 182 is withdrawn from the adjustment tank 181 and used as a sample solvent 182*a* for estimating the hydrogen ion concentration or the hydrogen ion exponent (pH). Then the sample solvent 182*a* and a water 200 are fed to a extraction column 201 to obtain a mixture. Preferably, the water 200 is a distilled water or an ion-exchanged water. Further, the volume of water fed to the extraction column 201 is preferably from 0.1 times to 10 times as large as that of the sample solvent 182*a*, and particularly from 0.5 times to 2 times, and especially their volumes are the same. In the extraction column 201, the mixture forms an aqueous phase 202 and an organic phase 203. Thereafter, the phases are separated. The aqueous phase 202 is fed to a pH meter 204, and the pH value of the aqueous phase 202 is measured by the pH meter 204. Note that the organic phase 203 is fed back into the adjustment tank 181 in view of circumstance maintenance and effect of recovering the solvent. In this case, it is preferable that the dehumidification (dehydration) is performed before feed back to the adjustment tank 181 in order to keep a quality of the solvent 182 in the adjustment tank 181. Data of the measurement is sent to a controller 205, and the controller 205 calculates the pH value on the basis of the data. In the present invention, pH METER F-13 (produced by Horiba Ltd.) and AN 570 (produced by Hitachi, Ltd) are used as the pH meter 204. However, the present invention is not limited in them.

Part of the solvent 182 is fed to a water content meter 206. In the water content meter 206, water content of the solvent 182 is measured, and the data of the measurement is sent to the controller 205. The controller 205 calculates the water content on the basis of the data. Note that the percentage of water content is determined in the following formula:

Percentage of Water Content (wt. %)=[Wa/Ws]×100

Wa: weight of water
Ws: weight of total solvent containing water

As the water content meter 206, there is Karl Fischer moisture titrator (produced by KEM). However, the present invention is not restricted in it. For example, there is FT-IR (Fourier Transform Infrared Spectroscopy) of online water content meter, such as NR-800 (produced by Yokogawa Electronic Coorporation) and the like.

In the controller 205 is stored data of the following formula which determines a preferable relation between the pH value (x) and the water content (y).

$$Y<0.0032x^2-0.093x+1.20$$

The particularly preferable relation is determined in the following formula:

$$Y<0.0031x^2-0.087x+1.02$$

The pH value (x) is preferably $3\leq x\leq 12$, particularly $3\leq x\leq 9$. When the pH value is less than 3 (x<3), then the solvent is strong acid. This situation is not preferable as the solvent would corrode the inner surfaces of pipes and devices so much. When the pH value is more than 12 (x>12), then the solvent is strong base. In this case, when water is contained in the solvent, then an ester bond of cellulose acylate would be decomposed in hydrolysis.

Further, the percentage of water content (wt. %) is preferably $0.2\leq y$. When the water content is smaller, then the water in the solvent or the dope does not damage the optical properties of the film. In this case, as the optical properties, there are, for example optical anisotropy, film transmittance and the like. The optical anisotropy is caused by nonuniform composition of the film where water is contained in the water. As the dope contains water, the film has nonuniform composition. The inventor considers, however, that when the dope contains no water, then the ions (such as iron ion, chrome ion, chloride ion and the like) cannot dissolve to the organic solvent to become the core of the impurities and the cause of the generation of the impurities. Accordingly, in the present invention, the dope contains a predetermined amount of water as a component of the solvent. As the water has polarization, iron, chrome and chlorine are dissolved to water. Thus it is reduced that the core of the impurities is generated. And dichloromethane is the main solvent of the dope. Accordingly in the present invention, when the hydrocarbon halide (such as dichloromethane) is used as the solvent for preparing the dope, then the solvent contains the components having hydrophilic property, such as alcohols (for example methanol, ethanol, n-butanol and the like), ketons (for example acetone and the like). Thus dichloromethane and water are mixed uniformly. In the present invention, the water content is at least 0.2 wt. % ($0.2\leq y$).

Figure 12:
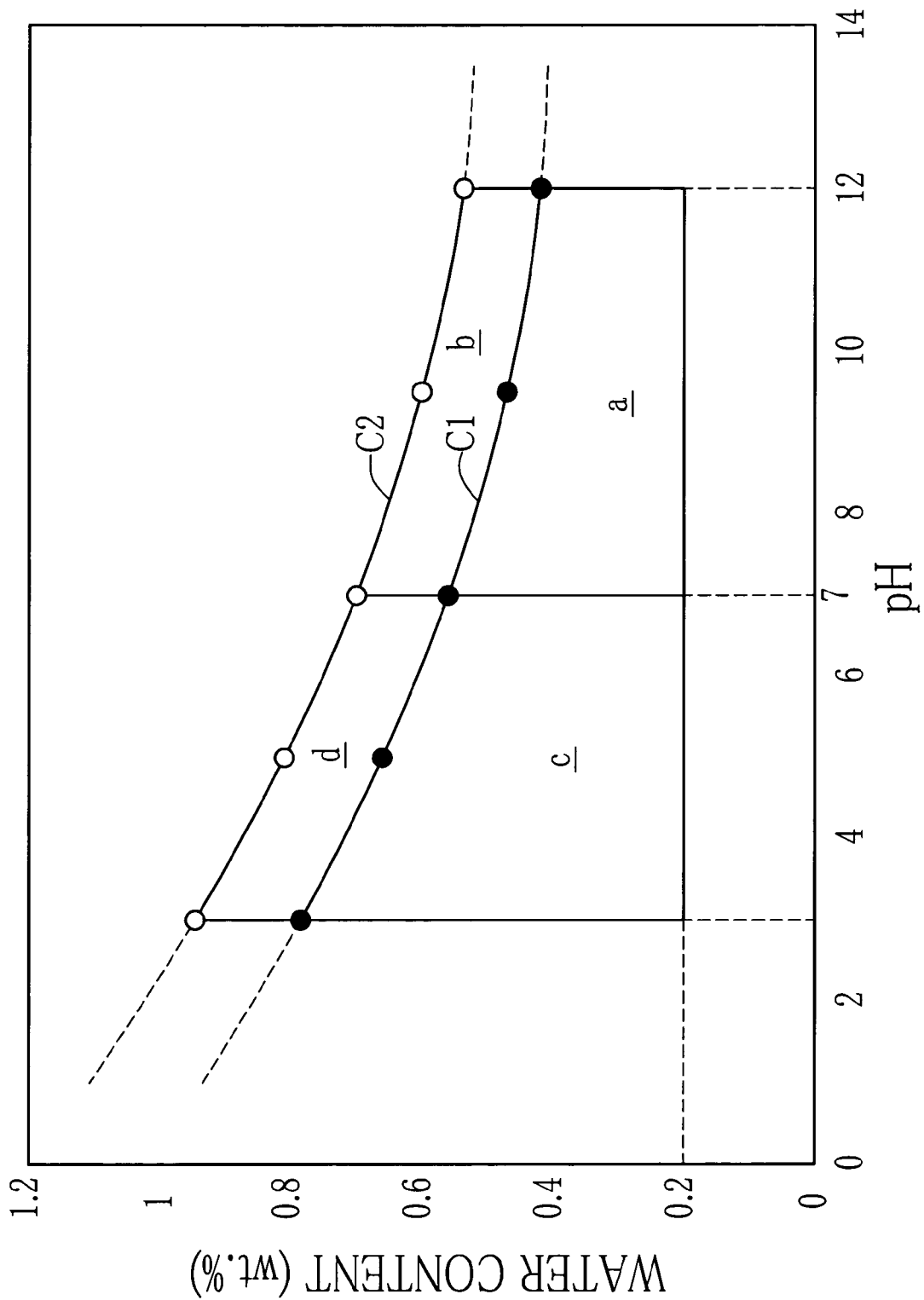
FIG. 12 is a graph illustrating a preferable range of conditions of a solvent in the present invention.

In FIG. 12, a quadrature axis and a vertical axis are respectively the pH value (x) and the percentage of water content, and the above two formulae are illustrated:

$$Y=0.0031x^2-0.087x+1.02 \qquad \text{C1}$$

$$Y=0.0032x^2-0.093x+1.20 \qquad \text{C2}$$

In the present invention, there is a case of adding the acidic material to the dope 12 in order to reduce the stop of the filter medium of the filtrating device 80. In this case, the solvent 182 satisfies the conditions of the pH value and the water content, preferably $3\leq x<7$ and $0.2\leq y\leq C2$ (corresponding to the region of (a+b)), particularly $3\leq x<7$ and $0.2\leq y\leq C1$ (corresponding to the region of a). In order to adjust the pH value (or the hydrogen ion concentration of the solvent 182), when the pH value is larger than the predetermined one, the acidic solution 207 is fed from the acidic solution tank 185 to the adjustment tank 181. Thereby the controller 205 controls to open and close a valve 187 such that the predetermined feed amount of the acidic solution 207 may be supplied. In the adjustment tank 181, the acidic solution 207 is added to the solvent 182, and the stirrer 183 stirs the solvent 182. When the pH value is smaller than the predetermined one, the alkali solution 208 is fed out from the alkali solution tank 186 by opening and closing the valve 188 and added to the solvent 182. Then the stirrer 183 stirs the solvent 182 to perform the mixing.

As the acidic compound, there are acetic acid, citric acid, citric acid ethylester (hereinafter, the meaning of citric acid ethylester contains esters between citric acid and ethyl alcohol), hydrochloric acid, sulfuric acid and the like. The use of sulfuric acid has a merit of easy supply and treatment. In the present invention, it is preferable to use citric acid and citric acid ethylester, in order to reduce the stop of the porous of the filter medium 30 in filtration of the dope 12 and to adjust the hydrogen ion exponent of the solvent 182. Further, acetic acid is contained in a cotton, the raw material of TAC. Accordingly, it is preferable to use acetic acid as it is not the cause of unexpected generation of impurities in the dope 12. Further, the alkali solution 208 is not restricted especially. However, when it is solution of sodium hydroxide, sodium acetylate or sodium salicylate, then the decomposition of the polymer (TAC) and the additives in the dope is reduced.

As described above, the tank, the tube or the like in the dope production line 10 is formed of stainless. As the stainless is excellent in corrosion resistance, it is usually hard that stainless dissolves to the dope, the solvent or the like. However, when the main solvent of the dope is hydrocarbon halide such as dichloromethane, then the solvent decomposes to generate the chloride ion or hydrochloric acid, which would corrode stainless during the continuous drive of the dope production line 10. Accordingly, it is preferable that the hydrogen ion exponent of the solvent or the dope is regulated in the neutral or base range (pH$\geq$7), which has no influence on the dissolubility of the solids and reduces the generation of the impurities.

In order to make such regulation, the solvent 182 may satisfy the conditions of the pH value and the water content corresponding to the preferable region (c+d) of $x\geq 7$ and $0.2\leq y\leq C2$, the particularly preferable region c of $x\geq 7$ and $0.2\leq y\leq C1$. Thus it is reduced that the solvent corrodes the inner surfaces of pipes and the devices. Accordingly, the iron and chrome don't dissolve to the solvent. Note that the alkali solution 208 is the solutions of sodium hydroxide, sodium carboxylate, or sodium salicylate.

Further, in order to regulate the percentage of water content of the solvent 182, water is removed from or added to the solvent 182. When water is removed, it is preferable to use the distillation column 191 in view of low cost. Note that a rectifier may be used instead of the distillation column 191 in order to regulate the water content more restictively. Further, water may be separated from the solvent by using a separation membrane. As the separation membrane, there is for example a liquid/liquid separation filter (produced by Asahi Kasei Corporation). Further, the dehydration agent may be used, such as Molecular Sieve (crystal zeolite), and the like.

In order to add the water to the solvent 182, the water 209 is fed from a water tank 189 to the adjustment tank 181. The controller 205 controls to open and close the valve 190 such that the adequate amount of the water is fed. Note that the water 209 is the ion-exchanged water (pH=5.5 to 7.5), so as to regulate the hydrogen ion concentration of the solvent 182.

In the present invention, the hydrogen ion concentration of the solvent is estimated with regard to that of aqueous phase of the mixture of the sample solvent.

Figure 13:
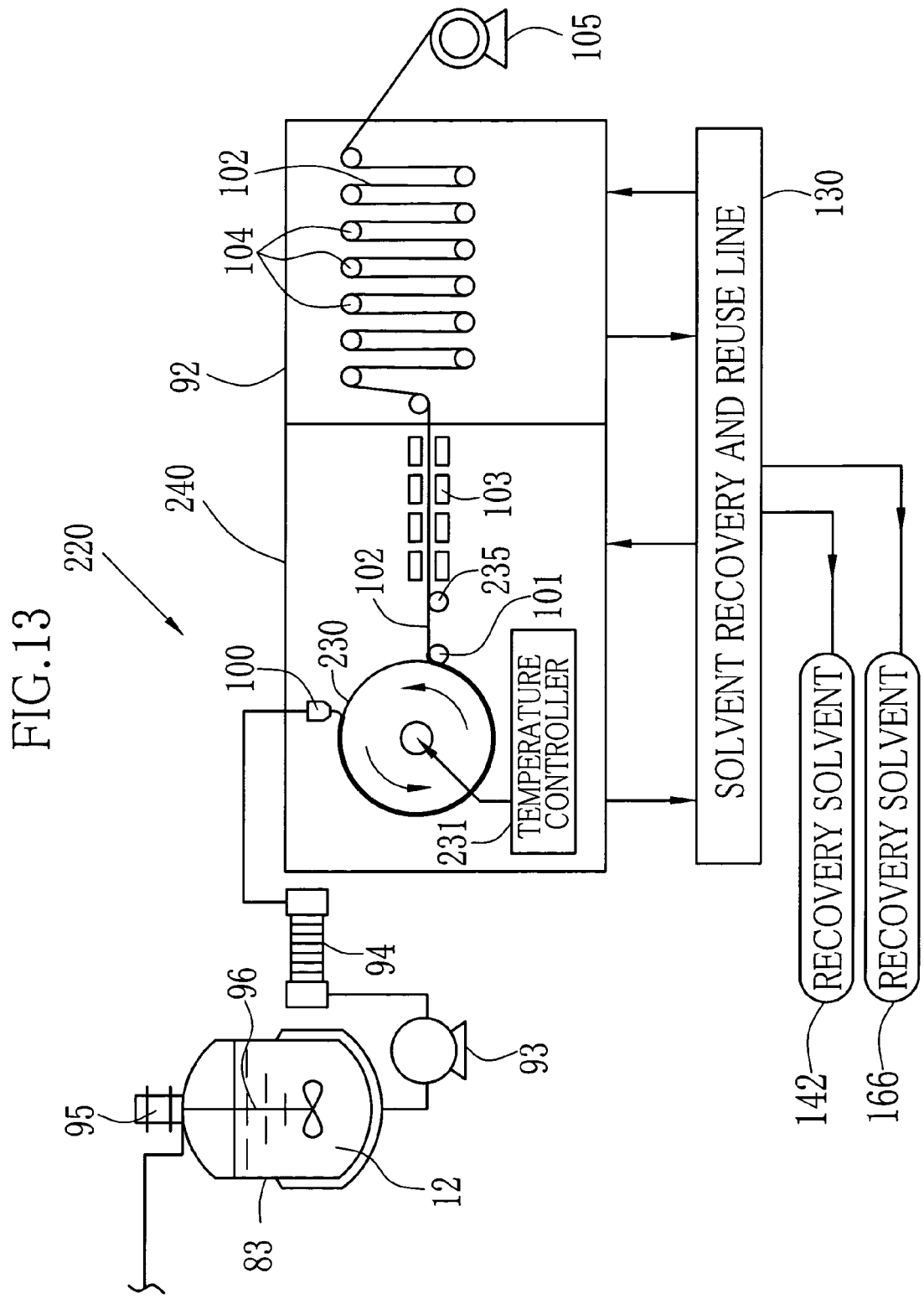
FIG. 13 is a schematic diagram of a second embodiment of a film production line.

As shown in FIG. 13, the film producing apparatus 220 is constructed of a film forming zone 240 and the film drying zone 92. In the film producing apparatus 90, the casting die 100 is disposed above a drum 230 which is rotated by drive of a rotating device (not shown). The drum 230 is connected to a temperature controller 231, so as to adjust the temperature of a surface of the drum 230. The temperature of the surface is not restricted especially. For example, when the dope 12 is gel-like material, then the temperature is preferable from −50° C. to +3° C. The casting speed (rotating speed) is not restricted especially, but preferably from 10 m/min to 200 m/min for producing the film in the film producing apparatus 220 in this figure, especially 50 m/min to 200 m/min for producing the film in high speed. After peeled from the drum 230, the film 102 was fed into a tenter dryer 103 with a support of a roller 235. Note that other parts, devices and structure are the same as FIG. 7, and the explanations thereof are omitted.

[Film and Film Product]

The film produced in the film production apparatus is used as a protective film for a polarizing filter. In the polarizing filter, the protective films are adhered to both surfaces of a polarized filter formed of a polyvinyl alcohol and the like. Further, there are optical function film, for example an optical compensation film in which an optical compensation sheet is adhered to the film to construct, and antireflection film in which an antiglare layer is formed on the film. These film products are used to construct part of a liquid crystal display. Further, the film is used as a film base of a photosensitive material.

Further, the film 102 obtained in the present invention almost does not contain foreign materials, and the quite small amount of the impurities in the dope. Concretely, the average number of the foreign materials whose maximal length is at least 20 μm is at most 0.03 in one square meter. When the conditions are adjusted, then the average number of such foreign materials is at most 0.02. The first condition is to adjust the percentage of the water content and the pH value. The second condition is that the average number can become lower when the maximal temperature $T_{max}$ of the wall of a heating section (not shown) in the heating device is at the maximum of the predetermined value, then it is restrained that the dope contains the substances (iron and chrome) constructing the devices. As the temperature of the dope and the solvent is regulated, it is most effectively reduced to generate the hydrochloric acid from dichloromethane, acetylic acid from cellulose triacetate, phosphoric acid from the additives (TPP, BDP) and the like.

[Method of Estimating Hydrogen-Ion Concentration of Solvent]

When the organic solvent contains water, then hydrogen ion H+ (or hydroxonium ion $H_3O+$) is generated. The hydrogen ion would cause to generate the impurities in the dope prepared from the organic solvent. Accordignly, it is necessary to estimate the hydrogen ion concentration of the organic solvent. However, the pH of the organic solution cannot be measured.

The water soluble elements are easily dissolved to the water than the organic solvent. Accordingly, in the present invention, in order to estimate the hydrogen ion concentration of the organic solvent, the water is mixed to a sample solvent which is sampled from the organic solvent. Concretely, the organic solvent which hardly dissolves to the water is hydrocarbon halide (for example dichloromethane, chloroform), fatty hydrocarbon (for example hexane), aromatic hydrocarmon (for example benzene) and the like. The amount of the water to be used is preferably 0.1-10 times as large as the sample solvent, particularly 0.5-2 times. Further, as the water, distilled water or the ion exchanged water are used.

At first, 10 mL-1000 mL of the sample solvent and the above amount of the water is mixed or thereafter stirred. The time for mixing or stirring is preferably 0.1 minutes-100 minutes, particularly 0.2 minutes-10 minutes, and especially 0.5 minutes-5 minutes. When the time is less than 0.1 minutes, then the water-soluble elements in the organic phase would not entirely transmitted into the water phase. Namely, the impurities cannot be entirely extracted. When the time is more than 100 minutes, then the compositions of the sample solvent may get denatured during the extraction. When the transport of the water-soluble elements is performed in well-known methods, then the long time is necessary for extraction of the water-soluble elements from the organic phase to the aqueous phase, which increases the cost. Note that the extraction was made in the well-known method, and the method of measuring the concentration of the hydrogen ion is based on JIS Z 8802. Thus the hydrogen ion concentration of the solvent which can hardly or not dissolve to water can be known. Thus the pH value can be estimated.

[Examination 1]

Examination 1 is made according to method of filtrating the dope (or the polymer solution). However, the present invention is not restricted in Examination 1. The explanation about Example 1 of the prior art is made at first. Then explanation about Example 2 is made in detail, and the explanations about Examples 3-10 of the filtration method of the present invention will follow. In Examples 3-10, the same explanations as in Example 2 are omitted.

EXAMPLE 1

A dope A1 was prepared in the dope production line 60 in FIG. 5. In order to prepare for the dope A1, the mixture solvent composed of dichloromethane (85 wt. %), methanol (12 wt. %), and 1-butanol (3 wt. %) was contained in the solvent tank 61, and fed to the dissolution tank 62. Thereafter, in the dissolution tank 62, cellulose acetate (degree of substitution 2.84) was fed as the polymer from the hopper 64 while the content of cellulose acetate was 23 kg in the ratio to 100 L of the mixture solvent. Further, the plasticizer solution was prepared so as to contain as the plasticizer TPP and BDP (TPP:BDP=2:1 in weight ratio) whose total weight was 1.2 kg, and fed from the plasticizer tank 65 to the dissolution tank 62. In the dissolution tank 62, the crude solution 69 of the mixture solvent, the polymer and the plasticizer solution was obtained by stirring at 80 rpm for 30 minutes by the stirrer 68 driven by a motor 67 whose power was 45 kW. Thereafter, the crude solution 69 was stored in the storage tank 70 and fed to the heating device 75. The heating device 75 heated the crude solution 69 to 85° C. inline, and kept this temperature for 10 minutes to obtain the dope A1 ("A1" is the sign used in Table 1). The concentration of cellulose acetate in the dope A1 was 19 wt. %. Then the dope A1 was filtrated with the filtrating device 80. A raw material of a filter medium B1 used in the filtrating device 80 was cellulose fiber made from pulp and linter ("B1" is the sign used in Table 2), and the filter medium B1 has thickness of 1.2 mm and pore whose diameter was 50 μm in average. The dope A1 was continuously produced. After 45 hours, the feed pressure of the pump 77 became above the predetermined value. Accordingly, the life of the filter medium B1 was determined as 45 hours. Note that the life or the driving time of the filter mediums in Examples 2-7 will be represented in ratio to the life (45 hours) in Example 1.

EXAMPLE 2

A dope A1 was prepared in the dope production line 60 in FIG. 5. In order to prepare for the dope A1, the mixture solvent composed of dichloromethane (85 wt. %), methanol (12 wt. %), and 1-butanol (3 wt. %) was contained in the solvent tank 61. Thereafter, citric acid C1 was added as the acidic material to the mixture solvent while the content of citric acid was 300 ppm to the weight of cellulose acetate. Then, the mixture solvent is fed into the dissolution tank 62. In the dissolution tank 62, cellulose acetate (degree of substitution 2.84) was fed as the polymer from the hopper 64 while the content of cellulose acetate was 23 kg in the ratio to 100 L of the mixture solvent. Further, the plasticizer solution was prepared so as to contain as the plasticizer TPP and BDP (in ratio 2:1) whose total weight was 1.2 kg, and fed from the plasticizer tank 65 to the dissolution tank 62. Then the stirrer 68 was driven by a motor 67 having power of 45 kW, so as to stir the mixture of the mixture solvent, the polymer and the plasticizer solution at 80 rpm for 30 minutes. Thus the crude solution 69 was obtained. Thereafter, the crude solution 69 was stored in the storage tank 70 and fed to the heating device 75. The heating device 75 heated the crude solution 69 to 85° C. inline, and kept this temperature for 10 minutes to obtain the dope A1. The filtration of the dope A1 was performed with a filtrating device (see FIG. 2). A raw material of a filter medium B1 used in the filtrating device 80 was cellulose fiber made of pulp and linter, and the filter medium has thickness of 1.2 mm and pore whose diameter was 50 μm in average. Then the dope A1 was filtrated with the filtrating device. The dope A1 was continuously produced. After 54 hours, the feed pressure of the pump 77 became above the predetermined value. Accordingly, the life of the filter medium B1 became 1.2 times longer than in Example 1.

EXAMPLE 3

In Example 3, a first treatment of the pore wall of the filter medium B1 was made. In the first treatment, the filter medium B1 was formed of cellulose fiber whose raw materials were made of pulp and inter. The pore wall of the pore was processed (see FIG. 3) such that the hydrogen atom on the hydroxide group 17 of cellulose may be substituted to the valeryl group (—CO—(CH$_2$)$_3$—CH$_3$) as the substutuent (—R') in the functional group 32. The filter medium B1 having 50 μm of average diameter of pore and 1.2 mm of thickness was set in a reaction tank containing pyridine of 1000 wt. % in the ratio to the weight of the filter medium B1. Then C$_4$H$_9$—CO—Cl of 100 wt % in the ratio to the weight of the filter medium B1 was added as the acylation reagent in the reaction tank, and 4-dimethylaminopyridine (DMAP) of 1 wt. % in the ratio to the weight of the filter medium B1 was supplied as a catalyst in the reaction tank. Thus the substitution reaction was made for 24 hours. Thereafter, the filter medium was removed from the reaction tank and washed with a tetrahydrofuran (THF). The valeryl group (—CO—(CH$_2$)$_3$—CH$_3$) were substituted for the 70% of hydrogen atoms on the hydroxyl groups (—OH) 33.

were substituted to the valeryl group Note that citric acid was not added as the acidic material to the mixture solvent.

Other conditions for producing the dope 12 were the same as in Example 2, and the life of the filter medium became 81 hours and 1.8 times longer than Example 1.

EXAMPLE 4

In Example 4, the filter material B1 was formed of cellulose fiber whose raw materials included pulp and linter. The pore wall of the pore was processed (see FIG. 4) such that the 3-carboxylpropanoil group (—CO—(CH$_2$)$_2$—COOH) was substituted as the functional group having acidic properties for the hydrogen atoms on the hydroxide group (—OH) 17 of cellulose. The functional group Z (see FIG. 5) in the substituent was —CO—(CH$_2$)$_2$—. In this case, succinic anhydrine (CH$_2$—CO—O—CO—CH$_2$) was used as the acylation agent. Then, the 3-carboxylpropanoil group (—CO—(CH$_2$)$_2$—COOH) was substituted for 50% of the hydroxyl groups 17. Further, citric acid was not added as the acidic material to the mixture solvent.

The same processing of the filter material B1 was made as in Example 3. Other conditions for producing the dope 12 were the same as in Example 2, and the life of the filter medium became 67.5 hours and 1.5 times longer than Example 1.

EXAMPLE 5

Citric acid ethyl ester C2 of 600 ppm in the ratio to the weight of cellulose acetate was added as the acidic material to the mixture solvent for preparing the dope so as to perform the first treatment (the same treatment as in Example 3). The same processing of the filter material B1 was made as in Example 3. Other conditions were the same as in Example 2. The life of the filter medium became 90 hours and twice longer than Example 1.

EXAMPLE 6

A raw material of a filter medium B2 used in the filtrating device 80 was formed of polypropyrene which has hydrophobic properties, and the filter medium had thickness of 0.8 mm and averaged diameter of pore was 30 μm. Other conditions were the same as in Example 2. The life of the filter medium became 72 hours and 1.6 times longer than Example 1. This result shows that the life of filter becomes longer also when the filter medium is formed of synthesized polymer fiber whose raw material is hydrophobic materials, such as polypropyrene.

EXAMPLE 7

A filter medium B3 used in the filtrating device 80 was formed of stainless fiber as the raw material, and the filter medium had thickness of 0.8 mm and averaged diameter of the pore was 10 μm. Other conditions were the same as in Example 2. The life of the filter medium became 58.5 hours and 1.3 times longer than Example 1.

EXAMPLES 8, 9

A dope (or cellulose acetate solution) A2 was prepared in the dope production line 60 in FIG. 5. The filter medium B1 was set in the filtrating device 80.

The mixture solvent used for the dope A2 was composed of methyl acetate (75 wt. %), acetone (12.5 wt. %), methanol (6.25 wt. %) and 1-butanol (6.25 wt. %). Cellulose acetate (degree of substitution 2.84) was added as the polymer to the mixture solvent while the ratio of amount of cellulose acetate was 19 wt. % to the mixture solvent 100 wt. %. Thus the dope A2 was prepared. Further, citric acid ethyl ester C2 of 600 ppm in the ratio to the weight of cellulose acetate was added as the acidic material to the mixture solvent. Other conditions were the same as in Example 2 for obtaining the dope A2. The life of the filter medium became longer than the prior art in which the acidic solvent was not added. Accordingly, also when methyl acetate may be used as the main solvent, the present invention cannot be applied. Further, in Example 9, the first treatment (the same treatment as Example 3 was made to the filter medium B1. Other conditions for producing the dope were the same as in Example 8, so as to prepare the dope. The life of the filter medium became 2.5 times longer than Example 8. Accordingly, Example 9 is the most effective embodiment of the present invention.

The dopes in Examples 2-9 were used to produce the film 102 in the film producing device 90 as illustrated in FIG. 8. In order to produce the film, the dope is cast from the casting die 100 onto the belt 99 such that the film 102 after being dried has thickness of 80 μm. The dope is dried to have the self supporting property, and thereafter the peel roller 101 peels the film 102. Then the film 102 is dried with the tenter dryer 103 for 10 minutes. Further, the film 102 was dried at 130° C. in the drying zone 92 for 30 minutes, and rolled with the winder 105. The retardation (Rth) in the thickness direction of the produced film 102 was measured at 632.8 nm of wavelength with an ellipsometer. The film 102 of all Examples 2-9 had the retardation of 40 nm, and was excellent in optical properties.

The conditions in Experiment are described in Tables 1-3. Table 1 shows the conditions of the dope (or cellulose acetate solution), Table 2 shows those of the filter medium, and Table 3 shows sorts of the dope, whether the acidic materials were added, and sort and amount of the acidic material, sorts of the filter medium, methods of surface processing, and life of the filter medium.

TABLE 1

| Dope | Degree of substitution | Composition of mixture solvent (ratio in weight) | Concentration of cellulose acetate (wt. %) |
|---|---|---|---|
| A1 | 2.84 | $CH_2Cl_2$:85<br>MeOH:12<br>1-BuOH:3 | 19 |
| A1 | 2.75 | Methyl acetate:75<br>Acetone:12.5<br>MeOH:6.25<br>1-BuOH:6.25 | 19 |

TABLE 2

| FM | Main material | Diameter of pore (μm) | Thickness (mm) |
|---|---|---|---|
| B1 | Cellulose fiber | 50 | 1.2 |
| B2 | Polypropyrene | 30 | 0.8 |
| B3 | Stainless fiber | 10 | 0.8 |

(cellulose fiber is formed from pulp and linter)

In Table 3, the following abbreviations are used:

Co.; Example 1

Ex.; Example

AM; Amount of added Acidic material to the Cellulose Acylate

FM; Filter medium

SFG; Substituted Functional Group

C1; Citric Acid

C2; Ethyl Citrate

D1; Functional Group Having Valeryl Group (—CO—$(CH_2)_3$—$CH_3$)

D2; Functional Group Having 3-carboxypropanyl Group (—CO—$(CH_2)_2$—COOH)

TABLE 3

| | | AM | FM | | Life of |
|---|---|---|---|---|---|
| | Dope | (ppm) | Sort | SFG (SD) | Filter Medium |
| Ex. 1 | A1 | None | B1 | None | 1 |
| Ex. 2 | A1 | C1 (300) | B1 | None | 1.2 |
| Ex. 3 | A1 | None | B1 | D1 (70) | 1.8 |
| Ex. 4 | A1 | None | B1 | D2 (50) | 1.5 |
| Ex. 5 | A1 | C2 (600) | B1 | D1 (70) | 2 |
| Ex. 6 | A1 | None | B2 | — | 1.6 |
| Ex. 7 | A1 | C1 (300) | B3 | — | 1.3 |

The subsidiary dope was prepared in the dope production line 60 in FIG. 6 in order to use in the co-casting die as illustrated in FIG. 8. A mixture solvent for the subsidiary dope is composed of dichloromethane (85 wt. %), methanol (12 wt. %), and 1-butanol (3 wt. %). Cellulose acetate (degree of substitution 2.84) was used as the polymer while the content of cellulose acetate was 23 kg in the ratio to 100 L of the mixture solvent. Further, the plasticizer solution was prepared so as to contain as the plasticizer TPP and BDP (in ratio 2:1) whose total weight is 1.2 kg. The mixture solvent, the polymer and the plasticizer solution were added in the dissolution tank 62 in the same conditions as in Example 2 to obtain the subsidiary dope. The subsidiary dope and the dope 102 were used to produce the film 102 in the film producing device 90 as illustrated in FIG. 8.

The retardation (Rth) in the thickness direction of the produced film 102 was measured at 632.8 nm of wave length with the ellipsometer. The film 102 of all Examples 2-9 had the retardation of 40 nm, and was excellent in optical properties.

[Examination 2]

Examination 2 was made according to the method of producing the film from the dope. In order to produce the dope, the solvent was used, which was recovered by adjusting the pH value and the percentage of the water content. The polymer film was formed of the dope in Examples 11-40. The explanation about Example 11 is made at first. Then the explanations about Example 12-40 will follow, and the same explanations as in Example 11 is omitted. Further the composition of the solvent is illustrated in Table 4. In Table 4, the percentage of water is the value when the percentage of the mixture solution is determined to 100 wt. %.

TABLE 4

| | Mixture Solvent | | | |
|---|---|---|---|---|
| | MeCl$_2$ (wt. %) | MeOH (wt. %) | 1-BuOH (wt. %) | H$_2$O (wt. %) |
| Solvent 1 | 83.5 | 16 | 0.5 | 0.2-0.5 |
| Solvent 2 | 84.5 | 13.5 | 2 | 0.2-1.0 |
| Solvent 3 | 85 | 12 | 3 | 0.2-1.0 |
| Solvent 4 | 87 | 13 | 0 | 0.2-1.0 |
| Solvent 5 | 92 | 8 | 0 | 0.2-1.0 |

Water (H$_2$O) in Table 4 was added to the mixture solvent for the estimation of the hydrogen ion concentration.

In Example 11, the dope was prepared in the dope production line 60 illustrated in FIG. 5. Solvent 1 was used as the mixture solvent for preparing the dope. The pH value and the percentage of the water content are adjusted to 3 and 0.9 wt. %, respectively. An acidic aqueous solution prepared from a purified water (pH=6.5) was added to solvent 1 for the adjustment of the hydrogen ion concentration, and the measurement of the pH value according to Solvent 1 was made as described above. Further, the measurement of the percentage of the water content was made with Karl Fischer moisture titrator (produced by Kyoto Electric Manufacturing Co., Ltd.).

A dope M1 was prepared in the dope production line 60 in FIG. 5. In order to prepare for the dope M1, the mixture solvent was contained in the solvent tank 61, and 100L of the mixture solvent is fed to the dissolution tank 62. Thereafter, 23 kg of cellulose acetate (degree of substitution 2.84) was fed as the polymer from the hopper 64 in the dissolution tank 62. Further, the plasticizer solution, which contains 1.2 kg of the mixture of TPP and BDP (in weight ratio 2:1) as the plasticizer, was fed to the dissolution tank 62. Then the stirrer 68 was driven by a motor 67 having power of 45 kW, so as to stir the mixture of the mixture solvent, the polymer and the plasticizer solution at 80 rpm for 30 minutes. Thus the crude solution 69 was obtained. Thereafter, the crude solution 69 was stored in the storage tank 70 and fed to the heating device 75. The heating device 75 heated the crude solution 69 to 120° C. inline, and kept this temperature for 10 minutes to obtain the dope M1. The concentration of cellulose acetate in the dope M1 was 19 wt. %. The inner wall of the heating device 75 was adjusted to the maximal temperature T$_{max}$ of 150° C. such that the maximal temperature of the dope may be 150° C. Then the dope M1 was filtrated with the filtrating device 80 in which the filter medium B1 was used. The dope M1 was continuously produced. After 67.5 hours, the feed pressure of the pump 77 became above the standard value.

The obtained dope was used to produce the film 102 in the film production line 90 (see, FIG. 7) to which the solvent recovery and reuse line 130 (see, FIG. 10) was attached. The dope 12 was fed to the filtrating device 94 with the pump 93. The nominal pore diameter (hereinafter the diameter of pore) was 50 μm, and the filter medium was formed of stainless fiber. The dope 12 was cast from the casting die 100 onto the band 99 so as to form the film 102 whose thickness and width were 80 μm and 1570 mm, respectively. Note, the temperature of the surface of the band 99 was kept in the range of 10° C. to 50° C. The drying was performed until the film 102 having self-supporting property was obtained. Then the film 102 was peeled from the band 99 with the peeling roller 101. The film 102 was tensed for 0.5 minute. Note that the film 102 is tensed in the feeding direction between the band 99 and a tensing start position of the tenter dryer 103 so as to be +4% larger. The tenter dryer 103 has clips (not shown) for tensing the film 102 in the widthwise direction. In the tenter dryer 103, the film 102 was tensed in the widthwise directions so as to become +7% wider to the width between the teeth.

In the film forming zone 91, the solvent vapor containing dichloromethane, methanol, 1-butanol was evaporated, and the air 150a containing the vapor solution was fed to the heat exchanger 140 (see, FIG. 10) and thereafter condensed and recovered as the recovery solvent 142 in the condensing device 141. The air containing component which had not liquidized was fed to the heat exchanger 140 by the air fan 143, and the heat exchange of the air was made. Thereafter, the air was heated so as to have a temperature from 60° C. to 145° C. Then the remaining air was fed out from the solvent recovery and reuse line 130 into the film forming zone 91 at the flow rate of 1 m/s to 20 m/s. The temperature of the drying zone 92 was kept from 100° C. to 135° C. The film 102 was guided by the roller 140, dried for 17 minutes, and wound by the winder 105.

In the drying zone 92, the air 150b containing the vapor composition was fed as hot air to the heat exchanger 151, and thereafter cooled in the cooling device 153. Then the part of the evaporated additives in air 150b were removed by the activated carbon 154 more over. Then water contained in the air 150 was removed with the dehumidifying device 155. Further, the air 150 was selectively fed to the adsorptives 157-159 with the air fan 156, while the selection is made by a directional control valve (not shown). The adsorption of the solvent contained in the air 150b was made. The adsorbing agent used in the adsorptives 157-159 was activated carbon. After adsorbing process, the temperature of the air was adjusted to the predetermined temperature by the temperature controller 160, and the heat exchange of the air was made in the heat exchanger 151. Further, the temperature of the drying air 161b heated by the heating device 163 was 50° C. to 150° C. The drying air 161b was fed out from the solvent recovery and reuse line 130 into the drying zone 92 at the flow rate of 0.1 m/s to 15 m/s.

The solvent vapor was adsorbed to the adsorptives 157-159 and desorbed by the desorption gas 164. The desorption gas was steam and fed out to the condensation tank 165. Thereafter the solvent was condensed and liquidized in the condensation tank 165. The liquidized recovery solvent was recovered. Then the recovery solvent 166 and the alkali solution 168 were fed to the extraction column 167. Thereby the alkali solution 168 was 10% of sodium hydroxide aqueous solution, and the volume thereof was 50 to 200 times as large as the recovery solvent 166. The extraction operation was made, in which the elements dissoluble to water is extracted in the water phase, and the water phase. Then the organic phase were separated. Then the water phase was abolished as the waste liquid 169. Further, the organic phase was fed to the dehydrating device 170 in which water in the organic phase was removed from the organic phase. Note that the distillation column was used as the dehydrating device 170. Then the purified solvents 171 obtained in the dehydrating device 170 and the purified solvent 146 obtained in the above explained process were fed to the solvent adjusting device 173.

The purified solvents 146, 172 were fed to the adjustment tank 181 with the pump 180 in FIG. 11. Then 100 mL of the solvent 182 was extracted from the adjustment tank 181, and the hydrogen ion concentration of thereof was measured with the pH meter 200 in offline. The pH meter 200 was pH METER F-13 (produced by Horiba Ltd.). Further, the standard solution was pH standard solution of salt of phthalic acid (pH=4.01) and pH standard solution of neutral salt of phosphoric acid (pH=6.86). The result of the measurement was pH=2.9 to 3.1. Furthermore, the content of water in the solvent 182 was measured with FT-IR NR-800 (produced by Yokogawa Electronic Corporation), and the result thereof was 0.97 wt. % to 1.03 wt. %. The data of the measurement was sent to the controller 205.

The alkali solution tank 186 contains sodium hydroxide aqueous solution as the alkali solution 204. The water tank 189 contains as the water 205 a pure water (ion-exchanged water, pH=6.5). The valves 188, 190 were opened and closed to feed the alkali solution 208 and the pure water 205. The pH value of the solvent 182 was adjusted to 3, and the percentage of the water content thereof was adjusted to 0.9 wt. %, then the solvent 182 was fed from the adjustment tank 181 to the recycle solvent tank 86, and reused as the solvent for preparing the dope.

The conditions of the film are inspected with a film inspection device in online. Thus the data of position and size of foreign materials in the film is obtained. On the basis of the data of formation, the estimation of the film is made, and the film having at least the predetermined quality is supplied in the market. The obtained film 102 has a length is 3900 m and a width 1340 mm. In the estimation of the film, the number of the foreign material whose size is at least 20 μm is counted, and the average number is calculated from the data of the number of the foreign material.

The estimation of the film 102 is made as follows:
A: the average number in 1 m$^2$ is less than 0.02 (Excellent);
B: the average number in 1 m$^2$ is at least 0.02 and less than 0.03 (good);
C: the average number in 1 m$^2$ is at least 0.03 and less than 0.04 (usable for the usual film product);
E: the average number in 1 m$^2$ is at least 0.04 (not usable, condition of the film surface is bad).

In Example 11, the average number in 1 m$^2$ was 0.003. The foreign materials were removed for componential analysis, and the analysis thereof was performed with Energy Dispersive X-ray Micro Analyzer (XMA: produced by Horiba Ltd.). The result of the analysis teaches that the main components of the foreign materials were Fe, Cr, Cl. The inventor considers that the reason of the content of iron and chrome is the precipitation of stainless of the dope production line 60 to the solvent or the dope, and that the content of the chloride is decomposition of dichloromethane. In the present invention, the pH value (x) is 3 and the percentage of the water content (wt. %) (y) was 0.9, which satisfy the formula (1), $y<0.0032x^2-0.093x+1.20$, and but not the formula (2), $y<0.0031x^2-0.087x+1.02$.

Further, the Retardation (Rth) in thickness direction of the film 102 was 43 nm when measured at 632.8 nm of wave length with an ellipsometer. Thus the film 102 contains the small amount of the foreign materials to be excellent in the optical property.

In Examples 12-15, the respective pH value of the organic solvent was respectively 5, 7, 9 and 12, and the respective percentages of the water contents were 0.8 wt. %, 0.7 wt. %, 0.6 wt. % and 0.5 wt. %. The conditions of the film surface satisfy the formula (1) but not the formula (2). Other conditions were the same as in Example 11. In each Example 12-15, the average number of the foreign materials was 0.03.

In Examples 16-20, the water contents of the organic solvents were respectively 0.75 wt. %, 0.65 wt. %, 0.55 wt. %, 0.45 wt. %, 0.4 wt. %. The conditions of the film surface satisfy the formula (1) but not the formula (2). Other conditions in Examples 16-20 were the same as in Example 11-15, respectively. The average numbers are shown in Table 5.

In Examples 21-25, the water contents of the organic solvents were respectively 1.2 wt. %, 1 wt. %, 0.9 wt. %, 0.8 wt. %, 0.7 wt. %. The conditions of the film surface satisfy the formula neither (1) nor (2). Other conditions in Examples 21-25 were the same as in Examples 11-15, respectively. The average numbers are shown in Table 6.

In Example 26, the maximal temperature $T_{max}$ of the heating device 75 was 110° C., and the pH value and the percentage of the water content of the organic solvent were respectively 5 and 0.8 wt. %. The conditions of the film surface satisfy the formula (1). Other conditions were the same as in Example 11. The average number was 0.02 in 1 m$^2$. The estimation of the film is C. The generation of the impurities were reduced.

In Example 27, the maximal temperature $T_{max}$ of the heating device 75 was 100° C., and the pH value and the percentage of the water content of the organic solvent were respectively 5 and 0.8 wt. %. The conditions of the film surface satisfy the formula (1). Other conditions were the same as in Example 11. The average number was 0.01 in 1 m$^2$. The estimation of the film was A. The generation of the impurities were reduced.

In Example 28, the diameter of the pore in the filtration mediums was 40 μm, and the pH value and the percentage of the water content of the organic solvent were respectively 5 and 0.8 wt. %. The conditions of the film surface satisfy the formula (1). Other conditions were the same as in Example 11. The average number was 0.02. The estimation of the film was C. The remove of the impurities were effectively made.

In Example 29, the diameter of the pore in the filtration mediums was 40 μm. Other conditions were the same as in Example 13. The average number was 0.02. The estimation of the film was C. The result shows that the filtration of the dope right before the casting has effects of reduction of the generation of the foreign materials independent of the pH-value, the percentage of the percentage of the water content and the like.

In Example 30, the pH value and the percentage of the water content of the organic solvent were respectively 5 and 0.5 wt. %. The condition of the film surface satisfies both the formulae (1) and (2). The maximal temperature $T_{max}$ of the heating device 75 was 100° C., and the diameter of the pore in the filter medium was 10 μm. Other conditions were the same as in Example 11. The average number of the foreign materials in the film sample was 0.001 in 1 m$^2$. The estimation was A. The quality of the film was excellent.

In Example 31, the pH value and the percentage of the water content of the organic solvent were respectively 5 and 0.2 wt. %. The condition of the film surface satisfies both the formulae (1) and (2). The quality of the film was excellent. The diameter of the pore in the filter medium was 40 μm. Other conditions were the same as in Example 11. The average number of the foreign materials in the film sample was 0.001 in 1 m$^2$. The estimation was A.

In Example 32, the solvent 2 illustrated in Table 4 was used as the mixture solvent. The pH value of the organic solvent was 5, and the percentage of the water content was 0.65 wt. %. The condition of the film surface satisfies both the formulae (1) and (2). Other conditions were the same as in Example 11. The average number of the foreign materials in the film sample was 0.02 in 1 m$^2$. The estimation of the film was C.

In Examples 33-35, the solvents 3-5 illustrated in Table 4 were respectively used as the mixture solvent. Other conditions were the same as in Example 32. The number of the foreign materials in the film sample was 0.02. The estimation of the film was C. The effects of the present invention was acknowledged also when the composition of the mixture solvent was changed.

In Example 36, the pH-value and the percentage of the water content of the organic solvent were respectively 1 and 1 wt. %. Other conditions were the same as in Example 11. The inner wall of the heating device 75 and the like was corrode too much, and the weight thereof becomes smaller. Further the large number of the foreign materials were observed in the film. In Example 37, the pH value was 14, and the percentage of the water content was 0.5 wt. %. Other conditions were the same as in Example 11. The number of the foreign materials was 0.06/m². The estimation of the film was E. The result teaches that the dope of the strong alkali is not adequate for the present invention.

In Example 38, the pH value was 5, and the percentage of the water content was 0.8 wt. %. The conditions of the film surface satisfy the formula (1). The maximal temperature $T_{max}$ of the heating device 75 was 170° C. Other conditions were the same as in Example 11. The average number of the foreign materials was 0.05 in 1 m². The estimation of the film was E. The number of the worthless material in the dope and that of the foreign materials in the film were large. The heating of the dope causes the generation of the foreign substances, and there was foreign materials in the polymer film.

In Example 39, the pH value was 5, and the percentage of the water content was 0.8 wt. %. The conditions of the film surface satisfy the formula (1). The maximal temperature $T_{max}$ of the heating device 75 was 50° C. Other conditions were the same as in Example 11. The number of the foreign materials in the film was too large. The reason therefore was that the dissolution of the solids was not enough.

In Example 40, the pH value was 5, and the percentage of the water content was 0.8 wt. %. The conditions of the film surface satisfy the formula (1). The diameter of the pore in the filtration mediums was 70 μm. Other conditions were the same as in Example 11. The average number was 0.035/m². The estimation of the film was A. The filtration before the casting was not done so much as Example 12.

Note that following abbreviations are used in Tables 5-7:
Sol.: Solvent
WC: Percentage of Water Content
$T_{max}$: Maximum Temperature of Heating Device 75
FD: Diameter of Pore of Filter medium
N: Number of Foreign Material Observed on Surface of Film
Es: Estimation
F(1): $F(1)=0.0032x^2-0.093x+1.20$
F(2): $F(2)=0.0031x^2-0.087x+1.02$
S: satisfying formula
N: Not Satisfying Formula
Ex.: Example

TABLE 5

|  | Sol. | pH | WC (wt. %) | $T_{max}$ (° C.) | FD (μm) | N (/m²) | Es | F(1) | F(2) |
|---|---|---|---|---|---|---|---|---|---|
| Ex. 11 | 1 | 3 | 0.9 | 150 | 50 | 0.03 | B | S | N |
| Ex. 12 | 1 | 5 | 0.8 | 150 | 50 | 0.03 | B | S | N |
| Ex. 13 | 1 | 7 | 0.7 | 150 | 50 | 0.03 | B | S | N |
| Ex. 14 | 1 | 9 | 0.6 | 150 | 50 | 0.03 | B | S | N |

TABLE 5-continued

|  | Sol. | pH | WC (wt. %) | $T_{max}$ (° C.) | FD (μm) | N (/m²) | Es | F(1) | F(2) |
|---|---|---|---|---|---|---|---|---|---|
| Ex. 15 | 1 | 12 | 0.5 | 150 | 50 | 0.03 | B | S | N |
| Ex. 16 | 1 | 3 | 0.75 | 150 | 50 | 0.02 | C | S | S |
| Ex. 17 | 1 | 5 | 0.65 | 150 | 50 | 0.02 | C | S | S |
| Ex. 18 | 1 | 7 | 0.55 | 150 | 50 | 0.02 | C | S | S |
| Ex. 19 | 1 | 9 | 0.45 | 150 | 50 | 0.02 | C | S | S |
| Ex. 20 | 1 | 12 | 0.4 | 150 | 50 | 0.025 | B | S | S |

TABLE 6

|  | Sol. | pH | WC (wt. %) | $T_{max}$ (° C.) | FD (μm) | N (/m²) | Es | F(1) | F(2) |
|---|---|---|---|---|---|---|---|---|---|
| Ex. 21 | 1 | 3 | 1.2 | 150 | 50 | 0.04 | E | N | N |
| Ex. 22 | 1 | 5 | 1 | 150 | 50 | 0.04 | E | N | N |
| Ex. 23 | 1 | 7 | 0.9 | 150 | 50 | 0.04 | E | N | N |
| Ex. 24 | 1 | 9 | 0.8 | 150 | 50 | 0.04 | E | N | N |
| Ex. 25 | 1 | 12 | 0.7 | 150 | 50 | 0.05 | E | N | N |
| Ex. 26 | 1 | 5 | 0.8 | 110 | 50 | 0.02 | C | S | N |
| Ex. 27 | 1 | 5 | 0.8 | 100 | 50 | 0.01 | A | S | N |
| Ex. 28 | 1 | 5 | 0.8 | 150 | 40 | 0.02 | C | S | N |
| Ex. 29 | 1 | 7 | 0.7 | 150 | 40 | 0.02 | C | S | N |
| Ex. 30 | 1 | 5 | 0.5 | 100 | 10 | 0.001 | A | S | S |

TABLE 7

|  | Sol. | pH | WC (wt. %) | $T_{max}$ (° C.) | FD (μm) | N (/m²) | Es | F(1) | F(2) |
|---|---|---|---|---|---|---|---|---|---|
| Ex. 31 | 1 | 5 | 0.2 | 150 | 40 | 0.001 | A | S | S |
| Ex. 32 | 2 | 5 | 0.65 | 150 | 50 | 0.02 | C | S | S |
| Ex. 33 | 3 | 5 | 0.65 | 150 | 50 | 0.02 | C | S | S |
| Ex. 34 | 4 | 5 | 0.65 | 150 | 50 | 0.02 | C | S | S |
| Ex. 35 | 5 | 5 | 0.65 | 150 | 50 | 0.02 | C | S | S |
| Ex. 36 | 1 | 1 | 1 | 150 | 50 | *1 | E | S | N |
| Ex. 37 | 1 | 14 | 0.5 | 150 | 50 | 0.06 | E | S | N |
| Ex. 38 | 1 | 5 | 0.8 | 170 | 50 | 0.05 | E | S | N |
| Ex. 39 | 1 | 5 | 0.8 | 50 | 50 | *2 | E | S | N |
| Ex. 40 | 1 | 5 | 0.8 | 150 | 70 | 0.035 | B | S | N |

*1: The decrease in the corrosion was too much
*2: The number of foreign materials was large Various changes and modifications are possible in the present invention and may be understood to be within the present invention.

What is claimed is:

1. A method for filtrating a cellulose ester solution by using a filter medium, said filter medium having many pores for trapping undissolved particles of an at least predetermined size, and the filter medium having hydroxyl groups and carboxyl groups directly adhered to a surface of the filter medium, said method comprising:
    dissolving a cellulose ester in a solvent to prepare said cellulose ester solution;
    adding to said cellulose ester solution at least one sort of acidic materials for preventing a hydrogen atom in said carboxyl group from being ionized before passing said cellulose ester solution through said filter medium; and
    passing said cellulose ester solution through said filter medium.

2. The method as claimed in claim 1, wherein said acidic material reduces a tendency of said undissolved particles under the predetermined size from adhering to the pore wall of said pore.

3. The method as claimed in claim 1, wherein said acidic material is further characterized by having an ionization constant (pKa) of at most 4.8 at 25° C.

4. The method as claimed in claim 3, wherein said acidic material is at least one of carboxylic acid, polycarboxylic acid and derivatives of said polycarboxylic acid, and said derivative includes salt form.

5. The method as claimed in claim 4, wherein each molecule of said derivatives of said polycarboxylic has at least one carboxyl group and at least one salt form of said carboxylate group, and is at least one of following substances:
- an ester of polycarboxylic acid having fatty hydrocarbon structure;
- an amide of polycarboxylic acid having fatty hydrocarbon structure;
- an ester of polycarboxylic acid having aromatic hydrocarbon structure;
- an amide of polycarboxylic acid having aromatic hydrocarbon structure;
- an ester of polycarboxylic acid having heterocyclic hydrocarbon structure; or
- an amide of polycarboxylic acid having heterocyclic hydrocarbon structure.

6. The method as claimed in claim 5, wherein said filter medium is formed of at least one of natural fiber, regenerated fiber, semi-synthetic fiber, synthetic fiber, and metal fiber.

7. The method as claimed in claim 6, wherein said filter medium is formed of cellulose fibers, and substituents or acidic groups are substituted for hydrogen atoms in at least one of plural groups of said cellulose fiber.

8. The method as claimed in claim 7, wherein the predetermined size is in the range of 1 to 10 µm.

9. The method as claimed in claim 8, wherein a flow rate of said cellulose ester solution is constant while said polymer solution is filtered.

10. The method as claimed in claim 9, wherein said flow rate is in the range of 50-250 L/(m$^2$·hr).

11. The method as claimed in claim 1, wherein said solvent comprises chlorinated organic solvent.

12. The method as claimed in claim 1, wherein said solvent comprises nonchlorinated organic solvent.

13. The method as claimed in claim 1, wherein the hydroxyl groups and carboxyl groups are directly attached to a pore wall of the filter medium.

14. A method for filtrating a polymer solution by using a filter medium, said filter medium having many pores for trapping undissolved particles of an at least predetermined size and said filter medium having hydroxyl groups and carboxyl groups directly adhered to a surface of the filter medium, said method comprising:
- substituting one or more substituents or acidic groups for hydrogen atoms in at least several ones of plural hydroxyl groups of said filter medium before passing said polymer solution through said filter medium;
- dissolving a polymer in a solvent to prepare said polymer solution; and
- passing said polymer solution through said filter medium.

15. A method as claimed in claim 14, wherein said polymer is cellulose ester.

16. The method as claimed in claim 14, wherein said substituents or acidic groups reduce said undissolved particles under the predetermined size from adhering to a pore wall of said pore.

17. The method as claimed in claim 16, wherein said solvent is prepared in steps of:
- adding a predetermined volume of water to a sample solvent which is sampled from said solvent, said predetermined volume being from 0.1 to 10 times as large as that of said sample solvent;
- extracting water-soluble elements in said sample solvent by said water;
- measuring a hydrogen ion concentration of said water; and
- adjusting a hydrogen ion concentration of said solvent such that the hydrogen ion concentration of said water becomes predetermined value.

18. The method as claimed in claim 17, wherein said substituent is at least one of following groups:
- saturated hydrocarbon or derivative thereof;
- nonsaturated hydrocarbon or derivatives thereof; and aromatic hydrocarbon or derivatives thereof.

19. The method as claimed in claim 17, wherein said acidic atomic group is at least one of following groups:
- carboxyl group;
- salt form of carboxyl group;
- sulfonic acid group; and
- salt form of sulfonic acid group.

20. The method as claimed in claim 19, wherein the predetermined size is 1-10 µm.

21. The method as claimed in claim 20, wherein a flow rate of said polymer solution is constant during the filtration of said polymer solution.

22. The method as claimed in claim 21, wherein said flow rate is in the range of 50-250 L/(m$^2$·hr).

23. The method as claimed in claim 21, wherein said polymer is cellulose ester.

24. The method as claimed in claim 23, wherein chlorinated organic solvent is used as a main solvent of said solvent.

25. The method as claimed in claim 23, wherein nonchlorinated organic solvent is used as a main solvent of said solvent.

26. The method as claimed in claim 16, wherein said polymer solution is used for producing a polymer film in a solution casting method.

27. The method as claimed in claim 26, wherein said solution casting method is a co-casting method in which plural polymer solutions are cast simultaneously.

28. The method as claimed in claim 26, wherein said polymer film is used as a protective film for a polarizing filter.

29. The method as claimed in claim 28, wherein said polarizing filter is used in a liquid crystal display.

30. The method as claimed in claim 26, wherein said polymer film is used for an optical compensation film.

* * * * *